United States Patent [19]

Botte et al.

[11] 4,317,203

[45] Feb. 23, 1982

[54] COLLATOR ERROR RECOVERY

[75] Inventors: Anthony J. Botte; James H. Hubbard, both of Boulder; Wayne E. Robbins, Longmont, all of Colo.; Paul R. Spivey, Clark County, Ky.

[73] Assignee: International Business Machines Corporation, Armonk, N.Y.

[21] Appl. No.: 77,064

[22] Filed: Sep. 19, 1979

[51] Int. Cl.³ .................... G06F 11/00; B65H 29/60
[52] U.S. Cl. ............................ 371/60; 270/58; 271/259; 271/296; 364/478
[58] Field of Search ............... 364/478, 580; 371/20, 371/57, 60; 270/56, 58, 82; 271/198, 287, 288, 296, 259

[56] References Cited

U.S. PATENT DOCUMENTS

| 3,618,936 | 11/1971 | Ziehm | 271/64 |
|---|---|---|---|
| 3,924,846 | 12/1975 | Reed | 270/56 |
| 3,927,878 | 12/1975 | Bolsenga et al. | 271/259 |
| 3,953,023 | 4/1976 | Cross et al. | 271/259 |
| 3,987,429 | 10/1976 | Manduley et al. | 364/478 |
| 3,997,154 | 12/1976 | Mol | 271/215 |
| 4,003,566 | 1/1977 | Brown | 270/58 |
| 4,026,543 | 5/1977 | Leclere | 271/290 |
| 4,072,304 | 2/1978 | Brown et al. | 270/58 |
| 4,086,658 | 4/1978 | Finlay | 364/900 |
| 4,121,818 | 10/1978 | Riley et al. | 364/478 |
| 4,141,546 | 2/1979 | Queener | 271/296 |
| 4,163,897 | 8/1979 | Hubbard | 235/92 SB |
| 4,170,349 | 10/1979 | Baumann et al. | 271/296 |
| 4,204,670 | 5/1980 | Traister | 271/287 |
| 4,211,483 | 7/1980 | Hannigan et al. | 270/58 |

FOREIGN PATENT DOCUMENTS 2140123 3/1973 Fed. Rep. of Germany.

Primary Examiner—Charles E. Atkinson
Attorney, Agent, or Firm—Carl M. Wright

[57] ABSTRACT

Sheet collator apparatus having means for recovery from collating errors. Moving between two adjacent bins without feeding a sheet, feeding two sheets into one bin, or feeding a sheet while the feeder is moving are errors that are detected and corrected. An error is corrected by homing the deflector and repositioning it at the correct bin before restart. The described embodiment includes two collators, i.e., tandem units.

9 Claims, 12 Drawing Figures

COLLATOR ERROR RECOVERY

DOCUMENTS INCORPORATED BY REFERENCE

U.S. Pat. No. 3,980,296 (Craft et al.) "Duplicating Machine Employing Image Reversing Optical Paths with Front Edge Document Alignment on Document Input and Output", hereinafter referred to as Ref. '296.

U.S. Pat. No. 4,012,032 (Rogers) "Document Reproduction Having Output Means with Plural Outputs Operable in a Plurality of Modes", hereinafter referred to as Ref. [032.

U.S. Pat. No. 4,086,658 (Finlay) "Input/Output and Diagnostic Arrangements for Programmable Machine Controllers Having Multiprogramming Capabilities", hereinafter referred to as Ref. '658.

U.S. Pat. No. 4,114,871 (Botte) "Collation Controls", hereinafter referred to as Ref. '871.

BACKGROUND OF THE INVENTION

This invention relates to the detection and correction or errors in the operation of sheet collators.

Collators, such as those used on copiers or printers, are provided for assemblying separate groups of copies produced from a set of original documents. Without a collator, the operator, when making multiple copies or prints, must separate and group together by hand the separate sets of copies made from the set of originals. Collators perform this function automatically while the copies are being made. Sheet collators are also used in industrial applications such as box making and the like where sheets of metal, cardboard, and so on, must be separated.

When used with a copying machine, the omission of a copy from a set presents a greater problem than the inclusion of duplicate copies of a page. Therefore, the invention is directed toward detecting and correcting automatically the failure of a collator to provide a copy of each document in each set of copies. This includes detecting a double feed at a bin because, since only a certain number of copies are made, the last bins would not receive a copy.

BRIEF SUMMARY OF THE INVENTION

A sheet collator having a plurality of bins for receiving sheets and directing means for directing a sheet into one of the bins is provided with a first switch for supplying a signal indicating that a sheet has entered a bin and with a second switch coupled to the directing means for supplying a signal indicating that the directing means is activated at one of the bins. A detector is responsive to the signals from the switches for detecting an error in the operation sequence of the collator. The machine is further provided with a recovery means that is responsive to the detector for correctly positioning the directing means so that correct operation of the collator can be resumed automatically.

DETAILED DESCRIPTION OF THE INVENTION

Sheet collators can be of the traveling distributor or the fixed (multiple) distributor type. In the traveling type, the distributor (directing means) travels between the bins for the purpose of deflecting sheets from a transport path into the bin at which the directing means is disposed. In the fixed type, each bin has a deflector which is selectively operable to intercept the sheet transporting path to direct a sheet into the associated bin. The following description is directed to an embodiment of the invention used in a traveling type collator but the terms and explanation are meant to cover both types.

Figure 1:
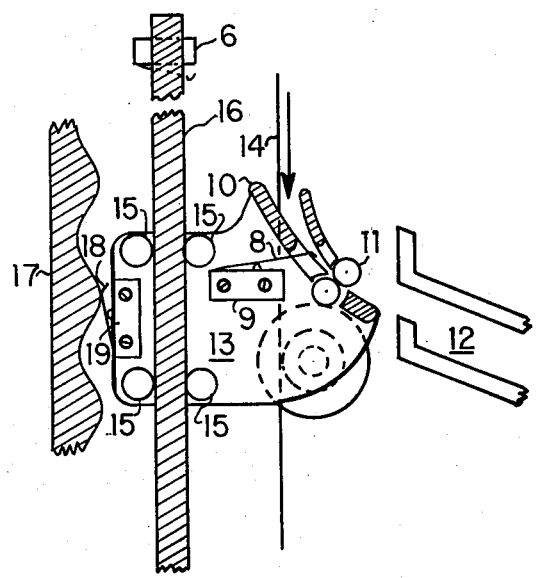
FIG. 1 is a cross-sectional side view of a directing means showing the location and function of the switches used in the practice of the present invention.

A cross-sectional view of a typical traveling directing means 13 is shown in FIG. 1. A belt 14 transports the sheets in a downward vertical direction until the sheet is intercepted by a deflector plate 10. The plate 10 deflects the sheet through a pair of pinch rollers 11 which drive the sheet into a bin 12. The directing means 13 moves vertically, supported by four guide rollers 15 which engage a vertical guide 16.

When the directing means 13 is disposed opposite a bin, an index switch 18 is closed by means of a follower 19 which moves along an index rack 17. A sheet switch 9 is closed by means of a follower 8 when a sheet is passed by the directing means 13 into a bin. A home switch 6 is closed by the directing means 13 whenever the directing means reaches the home position, hereinafter referred to as the reference position.

Figure 2:
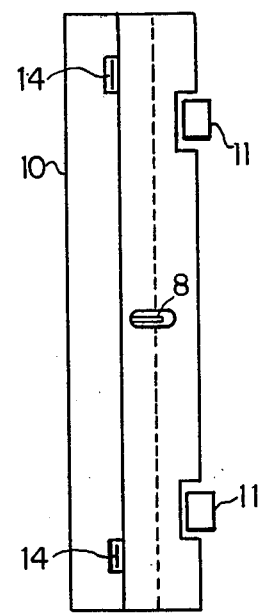
FIG. 2 is a top view of the directing means depicted in FIG. 1.

FIG. 2 is a top view of the directing means 13 showing the disposition of the sheet switch follower 8.

This description of the collator operation is provided merely as background of the description of the invention. More detailed explanations of the operation of collators are presented in References '296, '871, and '032.

Figure 3:
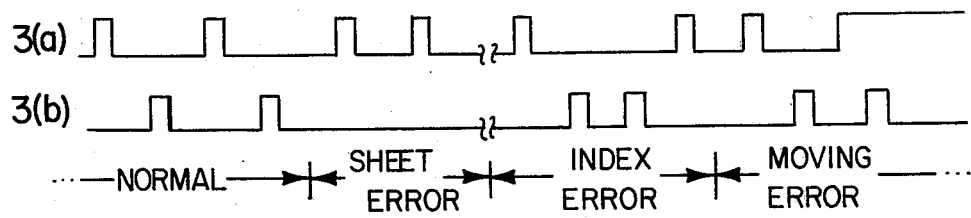
FIG. 3 is a graph of the index and sheet switch signals versus time.

The signals produced by the index switch 18 and the sheet switch 9 are shown in FIGS. 3(a) and 3(b), respectively. The first portion of FIG. 3 shows the normal sequence of operations of the switches, i.e., the index and sheet switches alternatively produce signals indicating that the directing means 13 is positioned at a bin as indicated by the index switch signal (FIG. 3(a)) followed by a sheet switch signal (FIG. 3(b)) indicating that a sheet has passed into the bin.

The second portion of FIG. 3 shows the signals that result from a sheet error, i.e., two successive closings of the index switch 18 without an intermediate closing of the sheet switch 9. This sequence indicates that the directing means 13 has passed a bin without feeding a sheet. Similarly, an index error is shown in the third portion of FIG. 3 as successive closures of the sheet switch 9 without an intermediate closure of the index switch 18. This sequence indicates that two sheets were fed into the same bin. The fourth portion of FIG. 3 shows the switch signals that occur when a sheet is fed while the directing means 13 is moving or when the index switch is stuck in the closed position.

Figure 4:
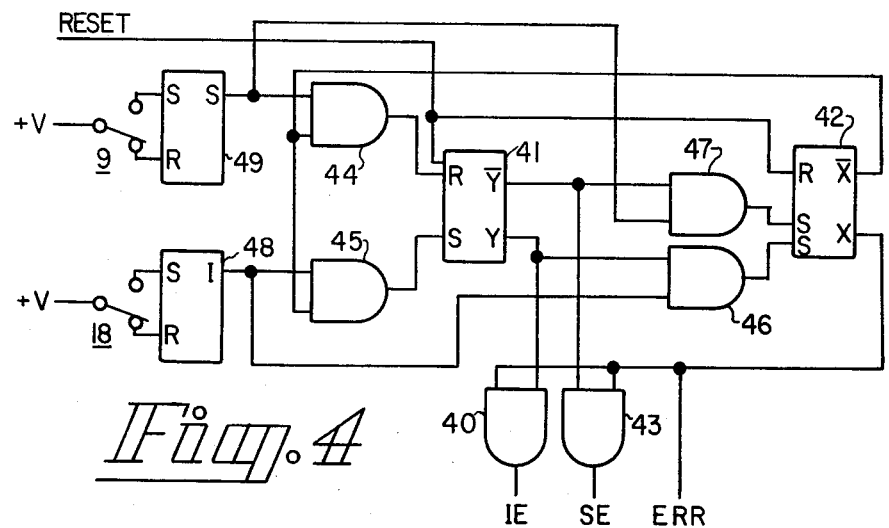
FIG. 4 is a logic diagram of an embodiment of a detector means according to the invention.

The logic circuit of FIG. 4 detects the above-described index and sheet errors. The index switch 18 and the sheet switch 9 have their closures integrated by two flip-flops 48 and 49, respectively. The flip-flops 48 and 49 are edge-triggered and provide output signals while the switches are made. The edge-triggered flip-flops 41 and 42 are initially in the reset condition. The flip-flop 41 monitors the sequence of the index and sheet switch closings and the flip-flop 42 is set when an error in that sequence occurs. Specifically, with the flip-flop 42 reset, closing the index switch enables an AND gate 45 to set the flip-flop 41. Subsequently, closing the sheet switch resets flip-flop 41 through an AND gate 44. If two index pulses occur in succession without an intermediate sheet switch signal, the flip-flop 48 will be set while the flip-flop 41 is set. This condition enables an AND gate 46 to set the error flip-flop 42, producing the error signal ERR. Similarly, if two sheet switch closures occur without an intermediate index switch closure, the flip-flop 49 will be set while the flip-flop 41 is reset, enabling an AND gate 47 to set the error flip-flop 42, providing the output error signal. A pair of AND gates 40 and 43 combine the error signal with the state of the flip-flop 41 to produce an index error signal (IE) or a sheet error signal (SE), respectively.

The logic circuit of FIG. 4 comprises a sequential machine. The preferred design, however, of sequential machines is by programming a microprocessor. The complexities of logic design are replaced by programming which is simpler to implement and easier to change, which were the impelling reasons for the development of microprocessors and the reasons for their success.

Ref. '658 explains in detail a microprocessor useful for practicing the invention as herein described in terms of a computer program for controlling a microprocessor. The instructions of the microprocessor include input instructions by means of which external signals can be sensed and output signals whereby controls of external devices can be effected. Ref. '871 shows the details for the control of a collator using a programmed microprocessor. References '658 and '871 provide the necessary and sufficient information for an understanding of the following description of the present invention. The invention is described by means of flowcharts and microcode tables, the steps of the flowcharts being labeled with the corresponding addresses of the related microcode program. A table of abbreviations is included as an Appendix for reference. The second column of the table contains an S, signifying a status bit; a C, signifying a control bit; a B, signifying a byte; or a P, signifying a processor subroutine.

Figure 6:
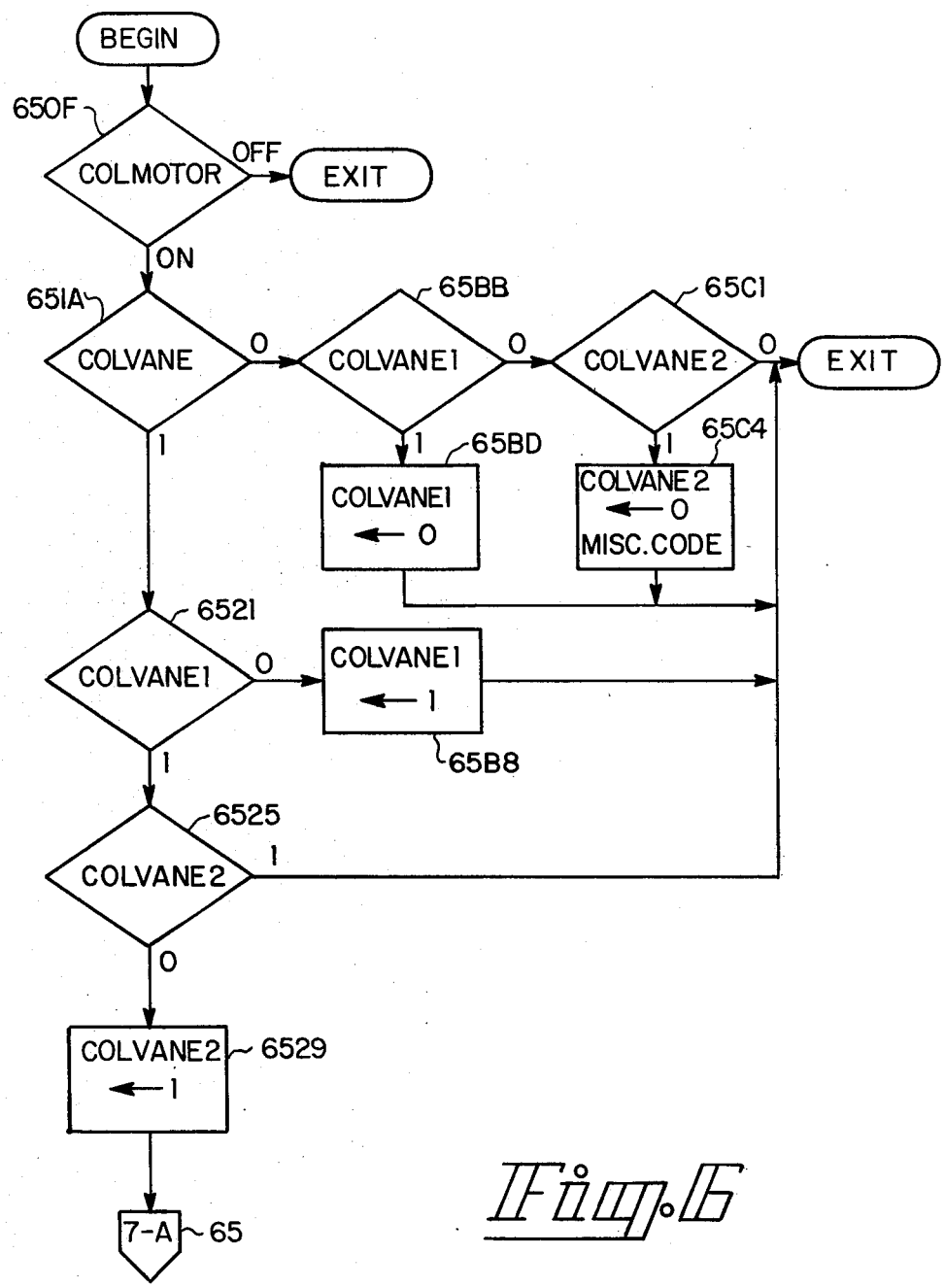
FIG. 6 is a flowchart showing the sequence of steps for sensing the sheet switch.
Figure 7:
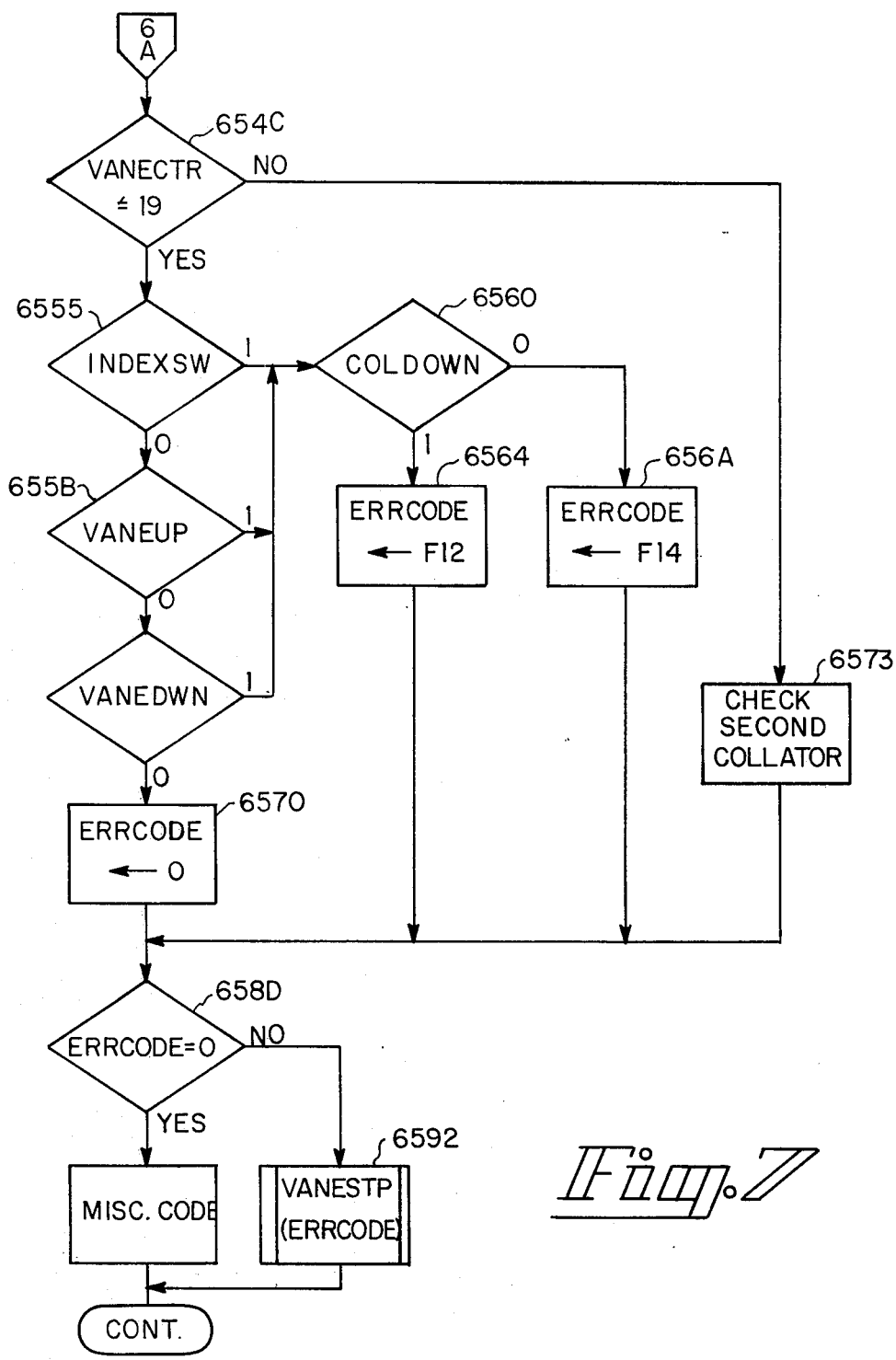
FIG. 7 is a flowchart showing the sequence of steps for detecting an index switch error.

FIGS. 6 and 7 with microcode Table I show a program for detecting index errors. As noted above, an index error occurs when a sheet is passing to a bin while the index switch is on, i.e., the directing means is in motion, or when two index signals occur without an intervening sheet switch closure.

APPENDIX

ABBREVIATIONS

| | | |
|---|---|---|
| CEVNEHLD | S | Do not move vane - in maintenance mode |
| CHKCOL | S | Check Collator |
| CINDX11 | S | Collator 1 Index Switch Integrator |
| CINDX12 | S | Collator 1 Index Switch Honored |
| CINDX21 | S | Collator 2 Index Switch Integrator |
| CINDX22 | S | Collator 2 Index Switch Honored |
| CL1INDX | S | Collator 1 Index Switch |
| CL2INDX | S | Collator 2 Index Switch |
| COLALGN | P | Collator Alignment Switch |
| COLCESW | P | Collator CE Switch Monitor |
| COLCE1 | S | Collator 1 in Maintenance Mode |
| COLCE2 | S | Collator 2 in Maintenance Mode |
| COLDOORS | P | Collator Door Monitor |
| COLDOWN | S | Indicates Collator Direction is Downward |
| COLDR1 (COLDR12) | S | Collator 1 Door Open |
| COLDR2 (COLDR22) | S | Collator 2 Door Open |
| COLECCNT | P | Collator EC Count - Derived from Copier EC |
| COLECCTR | B | Collator EC Counter |
| COLECGEN | P | Collator EC Generator |
| COLGATE | C | Collator Gate Control (when reset, directs sheets to collator) |
| COLMOTOR | C | Collator Motor On |
| COLMTRON | P | Collator Motor Control |
| COLNPRES | S | Collator Not Present |
| CPPIND | C | Check Paper Path Indicator |
| COLPTH1 | P | Collator Path Switch 1 |
| COLPTH2 | P | Collator Path Switch 2 |
| COLSELCT | P | Collator Mode Push Button Monitor |
| COLSTOP | S | Collator Stop |
| COLVANE | S | Collator Vane Switch (OR'ed from collators 1 & 2) |
| COLVANE | P | Collator Vane Process |
| Colvane1 | S | Collator Vane Switch Integrator Bit |
| COLVANE2 | S | Collator Vane Switch Honored Bit |
| COLVNCTR | P | Collator Vane Control |
| COL1HOM | S | Collator 1 at Home (reference) Position |
| COL2HOM | S | Collator 2 at Home (reference) Position |
| CPSB | B | Collator Program Status Byte |
| CSERROR | S | Collator Soft Error |
| CSOFTSTP | P | Collator Softstop Subroutine |
| ECn | S | Emitter Count n |
| ERRCODE | P | Error Code for Logging Various Errors |
| ERRLOG | P | Error Log Subroutine |
| HOM1COLR | S | Same as HOMCOL1R |
| MD1DOWNR | S | Collator 1 Down Request |
| MD2DOWNR | S | Collator 2 Down Request |
| MD1UPR | S | Collator 1 Up Request |
| MD2UPR | S | Collator 2 Up Request |
| RECVAN1R | S | Request for Vane Recovery on Collator 1 |
| RECVAN2R | S | Request for Vane Recovery on Collator 2 |
| STRTCOL | C | Start Collator Motor |
| VANECTR | B | Vane Counter |
| VANEDWN | C | Move Vane Down One Bin |
| VANERR1 | S | Error Occurred in Collator 1 |
| VANERR2 | S | Error Occurred in Collator 2 |
| VANESTP | P | Subroutine |
| VANEUP | C | Move Vane Up One Bin |
| VANEECCT | B | Vane Recovery Count |
| VECTUPDT | P | Vane Count Update Subroutine |

MICROCODE TABLE I

| LOC | OBJ | OP1 | OP2 | SOURCE STATEMENT |
|---|---|---|---|---|
| | | | | 1. IF (COLMOTOR) |
| | | SRG | BASERG | |

MICROCODE TABLE I-continued

| LOC | OBJ | OP1 | OP2 | SOURCE STATEMENT | | |
|---|---|---|---|---|---|---|
| 650F | A909 | 00C9 | | | | |
| | | | | TPB | PCB15,COLMOTOR | |
| 6511 | A67D | 007D | | | | |
| 6513 | 95 | 0005 | | | | |
| | | | | SRG | CPLRG | |
| 6514 | A9D0 | 00D0 | | | | |
| 6516 | 6A | 651A | | JNZ | COLV08 | * GO IF YES |
| 6517 | 30BF66 | 66BF | 0000 | BU | COLV210,R0 | * GO IF NO |
| | | | | 1. THEN | | |
| | | | 651A | COLV08 DC | * | |
| | | | | 2. . IF (COLVANE) | | |
| | | | | RIN | 0SB14 | GET STATUS |
| 651A | A6D5 | 00D5 | | | | |
| 6510 | 90 | 0000 | | TP | COLVANE | TEST IF COLVANE |
| 651D | A617 | 0017 | | LB | CPSB06 | GET STATUS |
| 651F | 3DBB | 65BB | | BZ | COLV90 | *GO IF COLVANE NOT ACTIVE |
| | | | | 2. . THEN | | |
| | | | | 3. . . IF (COLVANE1) | | |
| 6521 | AF40 | 0006 | | TS | COLVANE1 | TEST FOR COLVANE1 |
| 6523 | 3DB8 | 65B8 | | BZ | COLV80 | *GO IF NOT SET |
| | | | | 3. . . THEN | | |
| | | | | 4. . . . IF (COLVANE2) | | |
| 6525 | AF20 | 0005 | | TS | COLVANE2 | TEST FOR COLVANE2 |
| 6527 | 3CB7 | 65B7 | | BNZ | COLV70 | *GO IF SET |
| | | | | 4. . . . THEN | | |
| | | | | 5. . . . . COLVANE2=1 | | |
| 6529 | A117 | 0017 | | STB | CPSB06 | UPDATE |
| ... | | | | MISC CODE | | |
| | | | 654C | COLV10 DC | * | |
| | | | | 5. . . . . IF (VANECTR<=19) COLLATOR I | | |
| | | | | SRG | COLRG | |
| 654C | A9D0 | 00D0 | | | | |
| 654E | E4 | 0004 | | LR | VANECTR | |
| 654F | A819 | 0019 | | CI | X'19' | |
| 6551 | A61F | 001F | | LB | CPSB10 | |
| 6553 | 3E73 | 6573 | | BH | COLV16 | * GO IF NOT COL I VALUE |
| | | | | 5. . . . . THEN | | |
| | | | | 6. . . . . . IF (CINDX12 |VANEUP |VANEDWN) | | |
| 6555 | 91 | 0001 | | TP | CINDX12 | |
| 6556 | 60 | 6560 | | JNZ | COLV12 | |
| | | | | SRG | BASERG | |
| 6557 | A9C9 | 00C9 | | | | |
| 6559 | A675 | 0075 | | LB | PCB06 | |
| 655B | AB60 | 0060 | | NI | P(VANEDWN,VANEUP) | |
| | | | | SRG | COLRG | |
| 655D | A9D0 | 00D0 | | | | |
| 655F | 40 | | | JZ | COLV14 | |
| | | | | 6. . . . . . THEN | | |
| | | | 6560 | COLV12 DC | * | |
| | | | | 7. . . . . . . IF (COLDOWN) | | |
| | | | | TPB | CPSB06,COLDOWN | |
| 6560 | A617 | 0017 | | | | |
| 6562 | 97 | 0007 | | | | |
| 6593 | 4A | 656A | | JZ | COLV13 | |
| | | | | 7. . . . . . . THEN | | |
| | | | | 8. . . . . . . . ERRCODE=F12 | | |
| | | | | LID | COLF12ER | |
| 6564 | AE07 | 0749 | | | | |
| 6566 | 29 | | | | | |
| 6567 | AE49 | 0749 | | | | |
| 6569 | 01 | 6571 | | J | COLV15 | |
| | | | | 7. . . . . . . ELSE | | |
| | | | 656A | COLV13 DC | * | |
| | | | | 8. . . . . . . . ERRCODE=F14 | | |
| | | | | LID | COLF14ER | |
| 656A | AE07 | 0751 | | | | |
| 656C | 29 | | | | | |
| 656D | AE51 | 0751 | | | | |
| 656F | 01 | 6571 | | J | COLV15 | |
| | | | | 7. . . . . . . ENDIF | | |
| | | | | 6. . . . . . ELSE | | |
| | | | 6570 | COLV14 DC | * | |
| | | | | 7. . . . . . . ERRCODE— | | |
| 6570 | 25 | | | CLA | | |
| | | | | 6. . . . . . ENDIF | | |
| | | | 6571 | COL15 DC | * | |
| 6571 | 2C8D | 658D | | B | COLV20 | |
| | | | | 5. . . . . ELSE | | |
| | | | 6573 | COLV16 DC | * | |
| | | | | 6. . . . . . IF (CINDX22 |MD2VANUP |MD2VANDW) | | |

MICROCODE TABLE I-continued

| LOC | OBJ | OP1 | OP2 | SOURCE STATEMENT | | |
|---|---|---|---|---|---|---|
| 6573 | 93 | 0003 | | TP | CINDX22 | |
| 6574 | 6C | 657C | | JNZ | COLV17 | |
| | | | | SRG | BASERG | |
| 6575 | A9C9 | 0009 | | | | |
| 6577 | AB30 | 0030 | | NI | P(MD2VANDW,MD2VANUP) | |
| | | | | SRG | COLRG | |
| 6579 | A9D0 | 00D0 | | | | |
| 657B | 4C | 658C | | JZ | COLV19 | |
| | | | | 6. . . . . . THEN | | |
| | | 657C | | COLV17 DC | * | |
| | | | | 7. . . . . . . IF COLDOWN | | |
| | | | | TPB | CPSB06,COLDOWN | |
| 657C | A617 | 0017 | | | | |
| 657E | 97 | 0007 | | | | |
| 657F | 46 | 6586 | | JZ | COLV18 | |
| | | | | 7. . . . . . . THEN | | |
| | | | | 8. . . . . . . . ERRCODE=F17 | | |
| | | | | LID | COLF17ER | |
| 6580 | AE07 | 0757 | | | | |
| 6582 | 29 | | | | | |
| 6583 | AE57 | 0757 | | | | |
| 6585 | 0D | 658D | | J | COLV20 | |
| | | | | 7. . . . . . . ELSE | | |
| | | 6586 | | COLV18 DC | * | |
| | | | | 8. . . . . . . . ERRCODE=F18 | | |
| | | | | LID | COLF18ER | |
| 6586 | AE07 | 0758 | | | | |
| 6588 | 29 | | | | | |
| 6589 | AE58 | 0758 | | | | |
| 658B | 0D | 658D | | J | COLV20 | |
| | | | | 7. . . . . . . ENDIF | | |
| | | | | 6. . . . . . ELSE | | |
| | | 658C | | COLV19 DC | * | |
| | | | | 7. . . . . . . ERRCODE=0 | | |
| 658C | 25 | | | CLA | | |
| | | | | 6. . . . . . ENDIF | | |
| | | | | 5. . . . . ENDIF | | |
| | | 658D | | COLV20 DC | * | |
| | | | | 5. . . . . IF ($\overline{ERRCODE=0}$) | | |
| 658D | 2E | | | A1 | | |
| 658E | 2A | | | S1 | | |
| 658F | 47 | | | JZ | COLV25 | |
| | | | | 5. . . . . THEN | | |
| | | | | 6. . . . . . CALL VANESTP (ERRCODE) | | |
| | | | | SRG | BASERG | |
| 6590 | A909 | 0009 | | | | |
| 6592 | 321E67 | 0002 | 671E | BAL | R2,VANESTP | |
| | | | | SRG | COLRG | |
| 6595 | A9D0 | 00D0 | | | | |
| | | | | 5. . . . . ENDIF | | |
| | | | | 3. . . ELSE | | |
| | | 65B8 | | COLV80 DC | * | |
| | | | | 4. . . . COLVANE1=1 | | |
| 65B8 | A117 | 0017 | | STB | CPSB06 | UPDATE |
| | | | | 3. . . ENDIF | | |
| 65BA | 0F | 65BF | | COLV85 J | COLV95 | |
| | | | | 2. . ELSE | | |
| | | 65BB | | COLV90 DC | * | |
| | | | | 3. . . IF (COLVANE1) | | |
| 65BB | B6 | 0006 | | TR | COLVANE1 | TEST FOR COL VANE1 |
| 65BC | 41 | 6501 | | JZ | COLV100 | *GO IF NOT SET |
| | | | | 3. . . THEN | | |
| | | | | 4. . . . COLVANE1=0 | | |
| 65BD | A117 | 0017 | | STB | CPSB06 | UPDATE |
| 65BF | 24BF | 66BF | | B | COLV210 | |
| | | | | 3. . . ELSE | | |
| | | 6501 | | COLV100 DC | * | |
| | | | | 4. . . . IF (COLVANE2) | | |
| 65C1 | B5 | 0005 | | TR | COLVANE2 | TEST FOR COL VANE2 |
| 65C2 | 35BF | 66BF | | BZ | COLV210 | *GO IF NOT SET |
| | | | | 4. . . . THEN | | |
| | | | | 5. . . . . COLVANE2=0 | | |
| 65C4 | A117 | 0017 | | STB | CPSB06 | UPDATE |
| | | | | RIN | CSB14 | |
| | . . . | | | MISC CODE | | |
| | | | | 5. . . . . ENDIF | | |
| | | | | 4. . . . ENDIF | | |
| | | | | 3. . . ENDIF | | |
| | | | | 2. . ENDIF | | |
| | | | | 1. ENDIF | | |

MICROCODE TABLE I-continued

| LOC | OBJ | OP1 | OP2 | SOURCE STATEMENT |
|---|---|---|---|---|
| | 66BF | COLV210 | DC | * |
| | | ENDBEGIN | COLVANE | |

In FIG. 6 and Micro code Table I, the first step in determining an index switch error is checking the collator motor; COLMOTOR is a control bit used to turn the collator motor on. As shown in Table I, it is in PCB 15. (PCB is a program control byte and the collator motor bit is $2^4$ as indicated by the instruction at location 6513.) If the collator motor bit is off, the program is exited because the collator is not operational.

Otherwise, the sheet switch (COLVANE) is tested at location 651A via the collator program status byte 6. If the sheet switch is made, COLVANE1 is tested as shown at location 6521. COLVANE1 is an integration bit used to integrate the sheet switch closure. If COLVANE1 is not set, then at location 65B8 the COLVANE1 bit is set and the routine is exited. As will be explained below in more detail, the routine shown in FIGS. 6 and 7 and Table I is continually executed in sequence with many other routines. Therefore, after exiting the routine, the processor executes other instructions for other purposes, most of which are not related to the description of the invention and control returns to the execution of the present routine. The purpose of the integrator bit is to require two passes through the routine before the switch is considered to be closed. This prevents noise or transient signals from initiating the desired action. In other words, the sheet switch must be closed for two passes through the routine in order to be considered closed. If the collator switch is not closed at location 651A, then COLVANE1 is examined at location 65BB and reset at location 65BD if set. This integrates the opening of the switch in the same manner that the closing of the switch is integrated. If at location 65BB, COLVANE1 is not set, then at location 65C1 COLVANE2 is tested and reset if set. If COLVANE2 is reset or after it is reset at location 65C4, the program is exited.

At location 6521, if COLVANE1 is set, then the switch is integrated and COLVANE2 is tested. COLVANE2 is a status bit which indicates that the closure of the sheet switch was previously honored. That is, COLVANE2 being set at location 6525 indicates that the routine caused by the present closing of the vane switch was previously executed so that at location 6527, the routine is exited if COLVANE2 is set. At location 6525, if COLVANE is not set, then it is set at location 6529 and the routine continues in FIG. 7 as indicated by the off-page connector 65.

In FIG. 7, at location 654C, a sheet counter (VANECTR) is tested for a value of 19 or greater. VANECTR is a byte which counts the number of sheets that have passed through the directing means.

If the value in VANECTR is equal to or less than 19, a first collator is considered to be in operation. If the counter value is greater than 19, a second collator is presumed to be in use. In other words, the first collator consists of 20 bins with an additional 20 bins in the second collator. If the second collator is indicated, then the second collator is checked starting at location 6573 in the same manner as that now to be described for collator 1.

At location 654C, if the first collator is in operation, then its index switch (INDEXSW) (CINDX12 in the program) is checked at 6555, VANEUP is checked at location 655B, and VANEDWN is checked. (VANEUP and VANEDWN are checked at the same time in the described embodiment.) VANEUP is a control bit which activates a solenoid to move the directing means up one bin. VANEDWN is a control bit which operates a solenoid to move the directing means down one bin. If the index switch is made or the directing means is moving as indicated by the VANEUP or VANEDWN bits, an error is indicated. VANEUP or VANEDWN, whichever was set to move the vane, is normally reset by the index switch signal. The error, therefore, is that a sheet is being fed while the directing means is moving, the index switch is stuck in the closed position, or that there were two successive sheet signals without an intermediate index switch signal.

A status bit COLDOWN is tested at location 6560. COLDOWN is a status bit indicating that the directing means is moving in a downward direction. If reset, the directing means is moving in the upward direction. An error code is set to F12 at location 6564 if the directing means was moving in the down direction and, to F14 at location 656A if the directing means was moving in the upward direction when the error occurred. The direction of the directing means movement at the time of error is required for the recovery procedure to be described later.

If the index switch is not closed at location 6555 and the directing means is not moving at location 655B, then at location 6570, the error code is set to zero.

In Table I, from location 6573 to location 658C, the code is depicted for checking the second collator in the manner just described for the first collator.

At location 658D the error code is tested. If zero, miscellaneous instructions are executed for purposes not related to the present invention and the process is exited. If the error code is not zero, then at location 6592, a subroutine VANESTP is called which, as will be seen in the following explanation, will cause the collator to stop.

Figure 8:
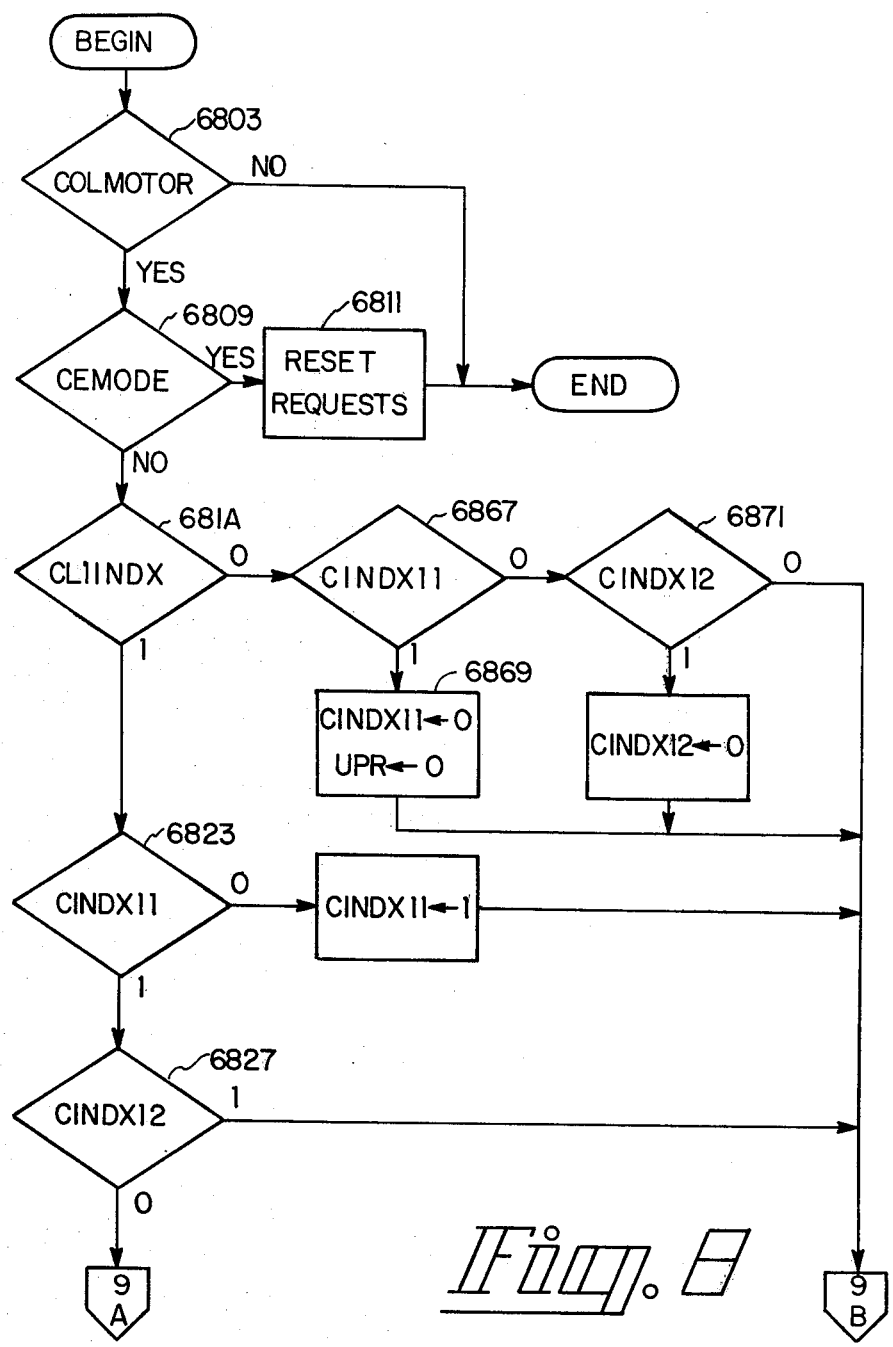
FIG. 8 is a flowchart showing the sequence of steps for sensing the index switches.
Figure 9:
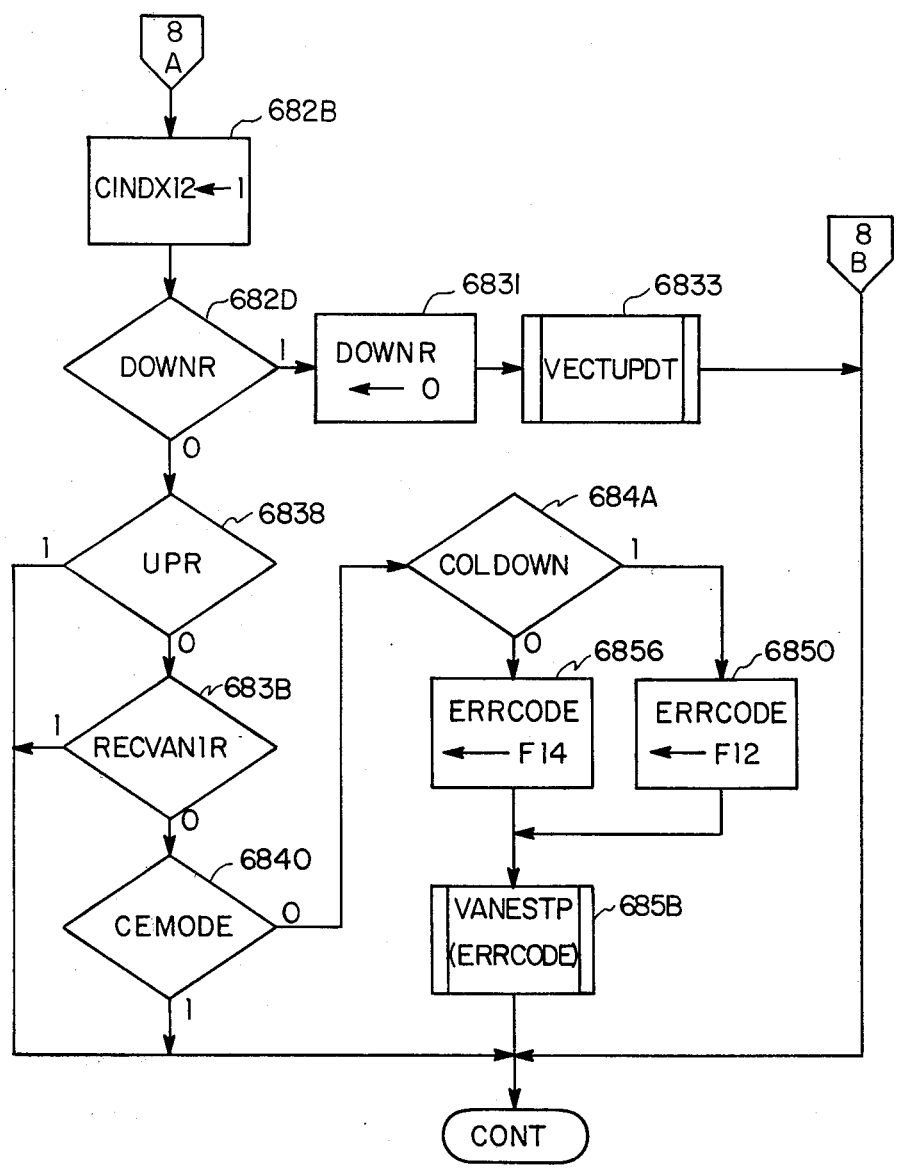
FIG. 9 is a flowchart showing the sequence of steps for detecting a sheet switch error.

The program for detecting a sheet switch error is set forth in Table II and in FIGS. 8 and 9. As noted above, a sheet error occurs when two closures of the index switch occur without an intermediate closure of the sheet switch. In the following explanation, it should be noted that the move requests, VANEUP and VANEDWN, are reset by the index pulses and set by the sheet switch signals. Therefore, if an index signal occurs when there is no move request, i.e., when VANEUP and VANEDWN bits are reset, then an error is indicated. The program to be explained for detecting a sheet switch error is included in a larger program segment as will be explained in more detail.

In FIG. 8, at location 6803, the COLMOTOR bit is tested to determine whether the collator is in operation. If the collator motor is not on, the routine is ended. Otherwise, a test is made at location 6809 to determine whether the machine is in the CE (maintenance) mode. If so, all move requests are reset at 6811 to suppress motion. If not in the maintenance mode, then the index switch bit for collator 1 (CL1INDX) is tested at location 681A. If reset, the index switch integrator bit (CINDX11) is checked at location 6867. If set, it is reset at location 6869 together with the UP request (UPR) bit and the program is exited.

MICROCODE TABLE II

| LOC | OBJ | OP1 | OP2 | SOURCE STATEMENT | |
|---|---|---|---|---|---|
| | | | | 1. IF (COLMOTOR) | |
| | | | | SRG | BASERG |
| 6803 | A9C9 | 00C9 | | | |
| | | | | TPB | PCB15,COLMOTOR |
| 6805 | A67D | 007D | | | |
| 6807 | 95 | 0005 | | | |
| 6808 | 47 | 6817 | | JZ | COLVC06 |
| | | | | 1. THEN | |
| | | | | 2. . IF (CEVNEHLD) | |
| | | | | SRG | COLRG |
| 6809 | A9D0 | 00D0 | | | |
| | | | | TPB | CPSB05,CEVNEHLD |
| 680B | A616 | 0016 | | | |
| 680D | 96 | 0006 | | | |
| 680E | 4A | 681A | | JZ | COLVC07 |
| | | | | 2. . THEN | |
| | | 680F | | COLVC05 DC | * |
| 680F | A990 | 0090 | | GI | INTOFFCG+COLRG |
| | | | | 3. . . RESET HOMCOL1R,HOMCOL2R,MD1UPR,MD2UPR,MD1DOWNR,MD2DOWNR | |
| | | | | TRMB | CPSB07,P(HOMCOL1R,HOMCOL2R,MD1UPR,MD2UPR,MD1DOWNR,MD2DOWNR) |
| 6811 | A618 | 0018 | | | |
| 6813 | AB03 | 0003 | | | |
| 6815 | A118 | 0018 | | | |
| | | | | COLVC06 DC | * |
| 6817 | 308D69 | 698D | 0000 | BU | COLVC290,R0 |
| | | | | 2. . ELSE | |
| | | 681A | | COLVC07 DC | * |
| | | | | 3. . . IF (CL1INDX) | |
| | | | | RIN | CSB06 |
| 681A | A6C5 | 0005 | | | |
| 681C | 97 | 0007 | | TP | CL1INDX |
| 681D | A9A0 | 00A0 | | GI | INTOFF |
| 681F | A61F | 001F | | LB | CPSB10 |
| 6821 | 3D67 | 6867 | | BZ | COLVC55 |
| | | | | 3. . . THEN | |
| | | | | 4. . . . IF (CINDX11) | |
| 6823 | AF01 | 0000 | | TS | CINDX11 |
| 6825 | 3D63 | 6863 | | BZ | COLVC45 |
| | | | | 4. . . . THEN | |
| | | | | 5. . . . . IF ($\overline{\text{CINDX12}}$) | |
| 6827 | AF02 | 0001 | | TS | CINDX12 |
| 6829 | 3C62 | 6862 | | BNZ | COLVC40 |
| | | | | 5. . . . . THEN | |
| | | | | 6. . . . . . CINDX12=1 | |
| 682B | A11F | 001F | | STB | CPSB10 |
| | | | | 6. . . . . . IF (MD1DOWNR) | |
| 682D | A618 | 0018 | | LB | CPSB07 |
| 682F | B5 | 0005 | | TR | MD1DOWNR |
| 6830 | 48 | 6838 | | JZ | COLVC15 |
| | | | | 6. . . . . . THEN | |
| | | | | 7. . . . . . . MD1DOWNR=0 | |
| 6831 | A118 | 0018 | | STB | CPSB07 |
| | | | | 7. . . . . . . CALL VECTUPDT (DEC VANRECCT) | |
| 6833 | 314867 | 0001 | 6748 | BAL | R1,VECTUPDT |
| 6836 | 2C62 | 6862 | | B | COLVC35 |
| | | | | 6. . . . . . ELSE | |
| | | 6838 | | COLVC15 DC | * |
| | | | | 7. . . . . . . IF ($\overline{\text{MD1UPR}}$ & $\overline{\text{RECVAN1R}}$ & $\overline{\text{(CEMODE>5)}}$) | |
| 6838 | 96 | 0006 | | TP | MD1UPR |
| 6839 | 3C62 | 6862 | | BNZ | COLVC30 |
| | | | | | TPB | CPSB13,RECVAN1R |
| 683B | A61D | 001D | | | |
| 683D | 92 | 0002 | | | |
| 683E | 3C62 | 6862 | | BNZ | COLVC30 |
| | | | | SRG | BASERG |
| 6840 | A9C9 | 0009 | | | |
| 6842 | A662 | 0062 | | LB | CEMODE |
| 6844 | A805 | 0005 | | CI | 5 |
| | | | | SRG | COLRG |
| 6846 | A9D0 | 00D0 | | | |
| 6848 | 3E62 | 6862 | | BH | COLVC30 |
| | | | | 7. . . . . . . THEN | |
| | | | | 8. . . . . . . . IF (COLDOWN) | |
| 684A | A920 | 0020 | | GI | INTON |
| | | | | TPB | OPSB06,COLDOWN |
| 684C | A617 | 0017 | | | |

MICROCODE TABLE II-continued

| LOC | OBJ | OP1 | OP2 | SOURCE STATEMENT | | |
|---|---|---|---|---|---|---|
| 684E | 97 | 0007 | | | | |
| 684F | 46 | 6856 | | JZ | COLVC20 | |
| | | | | 8. . . . . . . . THEN | | |
| | | | | 9. . . . . . . . ERRCODE=F12 | | |
| | | | | LID | COLF12ER | |
| 6850 | AE07 | 0749 | | | | |
| 6852 | 29 | | | | | |
| 6853 | AE49 | 0749 | | | | |
| 6855 | 0B | 685B | | J | COLVC25 | |
| | | | | 8. . . . . . . ELSE | | |
| | | 6856 | | COLVC20 DC | * | |
| | | | | 9. . . . . . . . ERRCODE=F14 | | |
| | | | | LID | COLF14ER | |
| 6856 | AE07 | 0751 | | | | |
| 6858 | 29 | | | | | |
| 6859 | AE51 | 0751 | | | | |
| | | | | 8. . . . . . . ENDIF | | |
| | | 685B | | COLVC25 DC | * | |
| | | | | 8. . . . . . . CALL VANESTP (ERRCODE) | | |
| | | | | SRG | BASERG | |
| 685B | A9C9 | 0009 | | | | |
| 685D | 321E67 | 0002 | 671E | BAL | R2,VANESTP | |
| | | | | SRG | COLRG | |
| 6860 | A9D0 | 00D0 | | | | |
| | | | | 7. . . . . . ENDIF | | |
| | | 6862 | | COLVC30 DC | * | |
| | | | | 6. . . . . ENDIF | | |
| | | 6862 | | COLVC35 DC | * | |
| | | | | 5. . . . ENDIF | | |
| | | 6862 | | COLVC40 DC | * | |
| 6862 | 05 | 6865 | | J | COLVC50 | |
| | | | | 4. . . . ELSE | | |
| | | 6863 | | COLVC45 DC | * | |
| | | | | 5. . . . . @INDX11=1 | | |
| 6863 | A11F | 001F | | STB | CPSB10 | |
| | | | | 4. . . . ENDIF | | |
| | | 6865 | | COLVC50 DC | * | |
| 6865 | 2C75 | 6875 | | B | COLVC75 | |
| | | | | 3. . . ELSE | | |
| | | 6867 | | COLVC55 DC | * | |
| | | | | 4. . . . IF (CINDX11) | | |
| 6867 | B0 | 0000 | | TR | CINDX11 | |
| 6868 | 41 | 6871 | | JZ | COLVC60 | |
| | | | | 4. . . . THEN | | |
| | | | | 5. . . . CINDX11=0 | | |
| 6869 | A11F | 001F | | STB | CPSB10 | |
| | | | | 5. . . . MD1UPR=0 | | |
| | | | | TRB | CPSB07,MD1UPR | |
| 686B | A618 | 0018 | | | | |
| 686D | B6 | 0006 | | | | |
| 686E | A118 | 0018 | | | | |
| 6870 | 05 | 6875 | | J | COLVC70 | |
| | | | | 4. . . . ELSE | | |
| | | | | COLVC60 DC | * | |
| | | | | 5. . . . IF (CINDX12) | | |
| 6871 | B1 | 0001 | | TR | CINDX12 | |
| 6872 | 45 | 6875 | | JZ | COLVC65 | |
| | | | | 5. . . . THEN | | |
| | | | | 6. . . . . CINDX12=0 | | |
| 6873 | A11F | 001F | | STB | CPSB10 | |
| | | | | 5. . . . ENDIF | | |
| | | 6875 | | COLVC65 DC | * | |
| | | | | 4. . . . ENDIF | | |
| | | 6875 | | COLVC70 DC | * | |
| | | | | 3. . . ENDIF | | |
| | | | | 4. . . . THEN | | |
| | | | | 5. . . . HOM1COLR, MD1DOWNR, MD1UPR, REVVANE=0 | | |

If the integrator bit is not set at location 6867, the honored bit (CIND12) is checked at location 6871 and reset if set, after which the program is exited.

If at location 681A the index switch is set, the integrator bit (CINDX11) is checked at location 6823. If reset, it is set and the process is exited. If set, the honored bit is tested at location 6827. If set, the program is exited; otherwise, it continues as shown in FIG. 9.

In FIG. 9, the CINDX12 bit is set at location 682B. At location 682D, the DOWN request (DOWNR) bit is checked. If set, it is reset at location 6831 and a VECTUPDT subroutine is called at location 6833. If the DOWNR bit is reset at location 682D, then at location 6838 the UPR bit is checked. At location 683B, the RECVAN1R bit is checked and at location 6840, at test is made to ascertain whether the machine is in the maintenance mode. If any one of these tests is true, that is, if there is an UP request, a RECOVERY request, or the machine is in the maintenance mode when there is no DOWN request, then there is no error. Otherwise, the absence of the request or motion during the index switch closure indicates an error. Therefore, at location 684A, a test is made to determine which direction the collator was moving, setting errors at locations 6850 or 6856. Then, at location 685B, the VANESTP subroutine is called to halt the machine.

A similar test is made for collator number 2 as for collator number 1 by the process just described.

Before proceeding with an explanation of the recovery procedure, some of the subroutines will be described in addition to the overall collator program.

Figure 11:
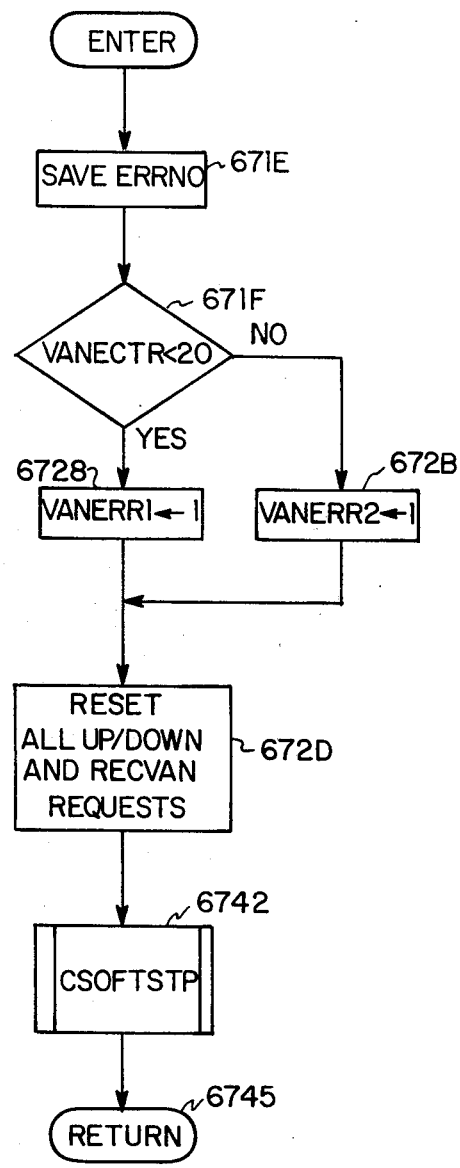
FIG. 11 is a flowchart of a subroutine VANESTP.

The VANESTP subroutine is shown in Table III and its flowchart is illustrated in FIG. 11. When the VANESTP subroutine is entered, the error number or error code is saved as shown at location 671E. At location 671F, a determination is made using the vane counter whether collator 1 or collator 2 was in error. If the VANECTR value is less than 20, then at location 6728, VANERR1 is set. If the vane counter is not less than 20, then at location 672B, VANERR2 is set. At location 672D, all the move requests as well as the recovery requests are reset and the subroutine from the subroutine CSOFTSTP, VANESTP returns to the calling program at location 6745.

Figure 10:
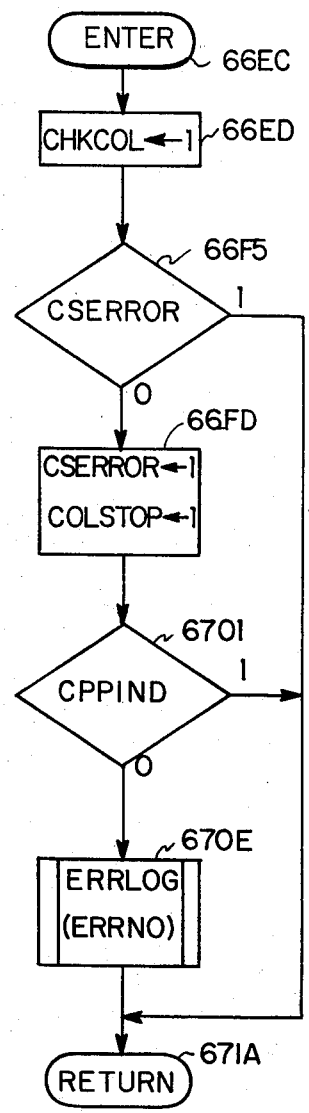
FIG. 10 is a flowchart of a subroutine CSOFTSPP.

The CSOFTSTP (collator soft stop) subroutine is illustrated in FIG. 10 and Table IV. (A hard stop is a stopping routine which immediately halts the machine because continued operation would cause damage; by contrast, a soft stop is a more orderly shut down because there is no immediate prospect of damage caused by continued operation.) It is entered at location 66EC and at location 66ED, the CHKCOL bit is set. This causes another section of the control program to stop the collator and to light the CHECK COLLATOR indicator. At location 66F5, CSERR is checked and, if set, causes the subroutine to return to the calling program via location 671A. If CSERROR is not set, it is set at location 66FD as is COLSTP. The CSERROR bit is the honored bit, indicating the CSOFTSTP subroutine was previously invoked. At location 6701, the Check Paper Path (CPP) indicator is tested and the subroutine returns to the calling program if it is set. If the CPP indicator is not set, then a subroutine error log is called at location 670E.

MICROCODE TABLE III

| LOC | OBJ | OP1 | OP2 | | SOURCE STATEMENT | |
|---|---|---|---|---|---|---|
| | | | | | BEGIN VANESTP (ERRNO) 'COLLATOR' | |
| | | 671E | | | ORG | VANESTP |
| | | | | 1. | SAVE ERRNO | |
| 671E | 80 | 0000 | | | STR | R0 |
| | | | | 1. | IF (VANECTR<20) | |
| 671F | A990 | 0090 | | | GI | INTOFFCG+COLRG |
| 6721 | E4 | 0004 | | | LR | VANECTR |
| 6722 | A820 | 0020 | | | CI | X'20' |
| 6724 | A61D | 001D | | | LB | CPSB13 |
| 6726 | 2D | | | | JC | VSTP05 |
| 6727 | 6B | 672B | | | | |
| | | | | 1. | THEN | |
| | | | | 2. | . VANERR1=1 | |
| 6728 | AF01 | 0000 | | | TS | VANERR1 |
| 672A | 0D | 672D | | | J | VSTP10 |
| | | | | 1. | ELSE | |
| | | 672B | | VSTP05 | DC | * |
| | | | | 2. | . VANERR2=1 | |
| 672B | AF02 | 0001 | | | TS | VANERR2 |
| | | | | 1. | ENDIF | |
| | | 672D | | VSTP10 | DC | * |
| | | | | 1. | RECVAN1R, RECVAN2R=0 | |
| | | | | | TRM | P(RECVAN1R,RECVAN2R) |
| 672D | ABF3 | 00F3 | | | | |
| | | | | 1. | NBILLCOL=1 | |
| 672F | AF10 | 0004 | | | TS | NBILLCOL |
| 6731 | A11D | 001D | | | STB | CPSB13 |
| | | | | 1. | MD1DOWNR, MD1UPR, MD2DOWNR, MD2UPR=0 | |
| | | | | | TRMB | CPSB07,P(MD1DOWNR,MD1UPR,MD2DOWNR,MD2UPR) |
| 6733 | A618 | 0018 | | | | |
| 6735 | AB93 | 0093 | | | | |
| 6737 | A118 | 0018 | | | | |
| | | | | 1. | CALL CSOFTSTP (ERRNO) | |
| | | | | | TPB | CSB07,INTBUSY1 |
| 6739 | A6C6 | 00C6 | | | | |
| 6738 | 96 | 0006 | | | | |
| | | | | | SRG | INTHRG |
| 673C | A9C8 | 00C8 | | | | |
| 673E | 61 | 6741 | | | JNZ | VSTP15 |
| 673F | A909 | 0009 | | | GI | INTONCG+BASERG |
| | | | 6741 | VSTP15 | DC | * |
| 6741 | E0 | 0000 | | | LR | R0 |
| 6742 | 31EC66 | 0001 | 66EC | | BAL | R1,CSOFTSTP |
| 6745 | 22 | 0002 | | | RTN | R2 |

CSOFTSTP is called at location 6742. After returning

MICROCODE TABLE IV

| LOC | OBJ | OP1 | OP2 | SOURCE STATEMENT | |
|---|---|---|---|---|---|
| | | | | BEGIN CSOFTSTP (ERRNO) 'COLLATOR' | |
| | | 66E0 | | ORG | CSOFTSTP |

MICROCODE TABLE IV-continued

| LOC | OBJ | OP1 | OP2 | SOURCE STATEMENT | |
|---|---|---|---|---|---|
| 66E0 | 80 | 0000 | | STR | R0 |
| | | | | 1. CHKCOL=1 | |
| 66ED | A9A0 | 00A0 | | GI | INTOFF |
| | | | | TSB | PSB05,CHKCOL |
| 66EF | A645 | 0045 | | | |
| 66F1 | AF10 | 0004 | | | |
| 66F3 | A145 | 0045 | | | |
| | | | | 1. IF (CSERROR) | |
| | | | | SRG | COLRG |
| 66F5 | A9D0 | 00D0 | | | |
| 66F7 | A619 | 0019 | | LB | CPSB08 |
| 66F9 | AF40 | 0006 | | TS | CSERROR |
| 66FB | 3412 | 6712 | | BNZ | CS510   *GO IF ALREADY ON |
| | | | | 1. THEN | |
| | | | | 2. . CSERROR, | COLSTOP=1 |
| 66FD | AF80 | 0007 | | TS | COLSTOP |
| 66FF | A119 | 0019 | | STB | CPSB08 |
| | | | | 2. . IF (CPPIND) | |
| | | | | SRG | INTHRG |
| 6701 | A9C8 | 00C8 | | | |
| | | | | TBP | CSB07;INTBUSYI |
| 6703 | A6C6 | 00C6 | | | |
| 6705 | 96 | 0006 | | | |
| 6706 | 69 | 6709 | | JNZ | CSS05 |
| 6707 | A909 | 0009 | | GI | INTONCG+BASERG |
| | | | 6709 | CSS05 DC | * |
| | | | | TBP | PCB13,CPPIND |
| 6709 | A67B | 007B | | | |
| 670B | 95 | 0005 | | | |
| 670C | 6A | 671A | | JNZ | CSS15 |
| | | | | 2. . THEN | |
| | | | | 3. ... CALL | ERRLOG (ERRNO) |
| 670D | E0 | 0000 | | LR | R0 |
| 670E | 33E51A | 0003 | 1AE5 | BAL | R3,ERRLOG |
| 6711 | 0A | 671A | | J | CSS15 |
| | | | | 2. . ENDIF | |
| | | | | 1. ENDIF | |
| | | | 6712 | CSS10 DC | * |
| | | | | SRG | INTHRG |
| 6712 | A9C8 | 00C8 | | | |
| | | | | TPB | C5B07,INTBUSYI |
| 6714 | A6C6 | 00C6 | | | |
| 6716 | 96 | 0006 | | | |
| 6717 | 6A | 671A | | JNZ | CSS15 |
| | | | | SRG | BASERG |
| 6718 | A9C9 | 00C9 | | | |
| | | | 671A | CSS15 DC | * |
| 671A | 21 | 0001 | | RTN | R1 |

The CPP bit test prevents the logging of the second error in case a previous error has occurred and is also used to shut down the machine.

The ERRORLOG subroutine is not shown in detail; it merely increments a counter in a particular portion of the memory associated with the error code so that the maintenance personnel can determine the number of times the error occurred.

VECTUPDT is another subroutine not shown; its purpose is merely to increment the value of the VANECTR each time it is called.

The entire program for controlling the copier and the collator is extensive and comprises many thousands of bytes. The program is divided into various modules or processes. A process is equivalent in this explanation to a subroutine. A subroutine can be of two types, out-of-line or in-line. An out-of-line subroutine usually is stored at a location outside the main program and control is transferred thereto by a calling procedure. For example, the branch and link instruction as explained in detail in Ref. '658 provides for branching to subroutines. At the completion of the subroutine, control is transferred to the instruction following that which called the subroutine. Therefore, out-of-line subroutines are stored only once in the memory but may be executed from any point in the program.

An in-line subroutine or process is included in the sequence of instructions at each place it is used. It is stored in the memory as many times as it is used.

Externally, the execution of out-of-line and in-line subroutines are the same. They are performed at a certain location in the main program and the program continues from that location.

Figure 12:
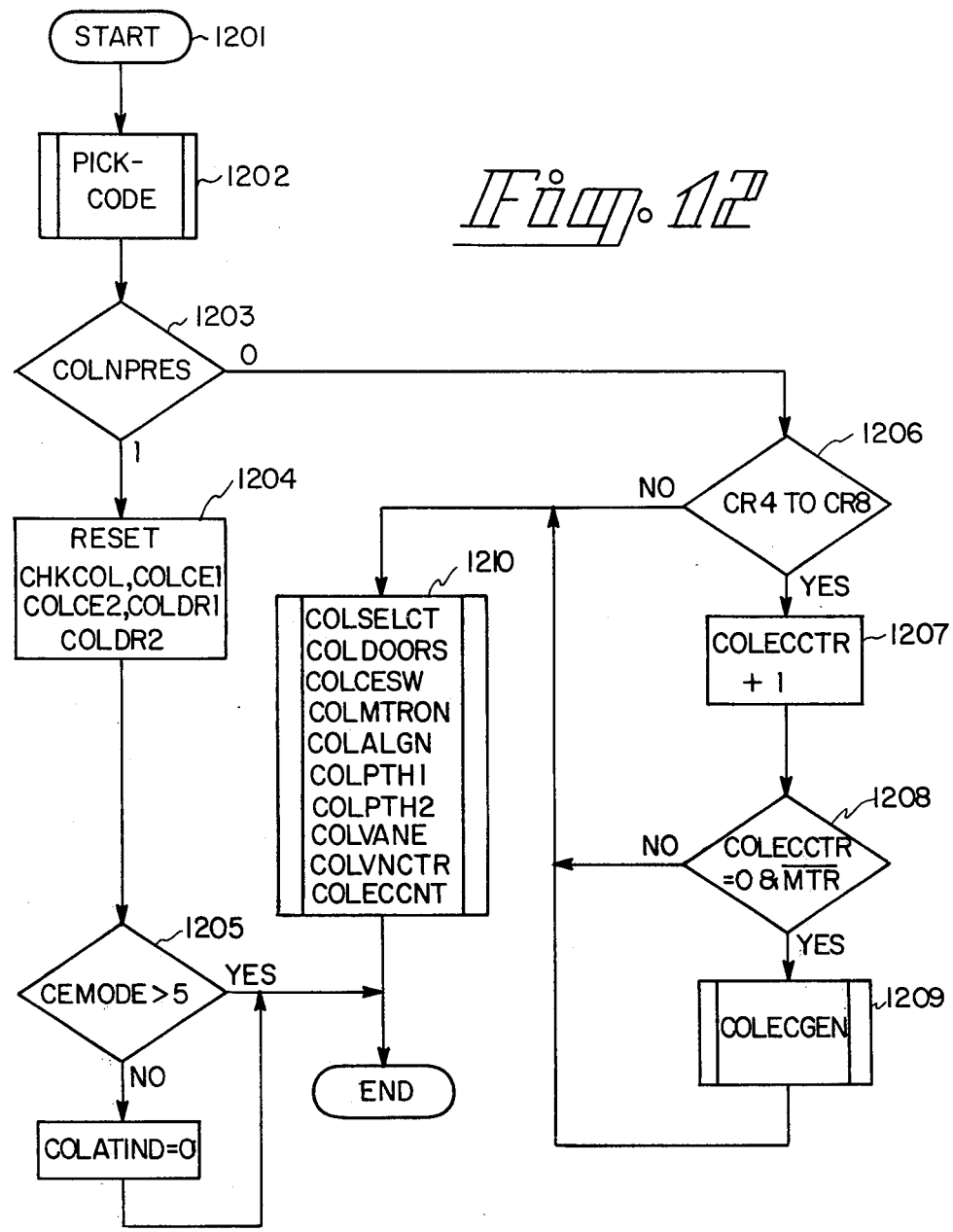
FIG. 12 is a flowchart of a process named COLLATOR.

The complete program for copier control comprises several processes, one of which is a collator process which itself comprises other processes. FIG. 12 is a flowchart illustrating the collator and process for which no program detail is provided. This explanation is merely to clarify the composition and relationships of the various programs and subroutines being described in this invention. The collator process starts at location 1201 and is executed continually in its turn as part of the overall program. The subroutine PICKCODE at location 1202 is called to cause the copier to pick paper from the copy supply. Upon return from the subroutine, the COLNPRES bit is tested at location 1203. If set, it indicates that there is no collator so that, at location 1204, all the signals relating thereto are reset. If the maintenance mode selected is not greater than 5 as shown at location 1205, the collator indicator (COLATIND) bit is reset. Otherwise, the collator process ends and the next process in the overall program begins. At location 1203, the COLNPRES bit reset indicates that the collator is present. Control registers 4 through 8 are checked at location 1206. If the machine timing indicates that the copier operation is in a time frame indicated by control registers (CR) 4 through 8, then the collator EC counter (COLECCTR) is decremented by one as shown at location 1207. The COLECCTR is used in timing the operation of the collator. At location 1208, the COLECCTR is checked for zero and the copier motor is checked. If the COLECCTR is zero and the copier motor is not running, then at location 1209, a subroutine COLECGEN is called to supply a collator EC number. At location 1208, if the motor is on or if the collator EC counter is not zero, then several processes are sequentially executed as shown at location 1210. These processes are executed in the order shown, after which the process following the collator process in the overall program is started. The processes shown at location 1210 are in-line processes, some of which call various off-line subroutines such as VANESTP. The VANERR check described in connection with FIGS. 6 and 7 are part of the COLVANE process. The VANERROR test program is also part of the COLVANE control process.

The recovery program to be described includes parts of the COLVNCTR process, a COLRST1 subroutine, and two synchronous programs, EC4 and EC9.

The overall control program for the machine is initiated every other time the power line input crosses the zero voltage value. That is, for 60-cycle input power, the overall program is executed 60 times per second. Certain processes are connected with the operation of the copier, as explained in detail in the incorporated references, and must be synchronized with the position of the copier drum. The timing pulses from the drum are called EC or emitter counts. Each half-revolution of the drum produces a set of EC's which sets occur at a relatively slow rate, i.e., only two or three times per second.

When an EC pulse occurs, an interrupt is generated which calls an interrupt handling routine. This routine suspends the main program, determines the cause of the interrupt, and causes an appropriate subroutine to be executed. Therefore, the EC4 and EC9 routines to be described in connection with the error recovery routines occur once for approximately every fifty times that the main program, and subsequently the collator routine, is executed.

Figure 5:
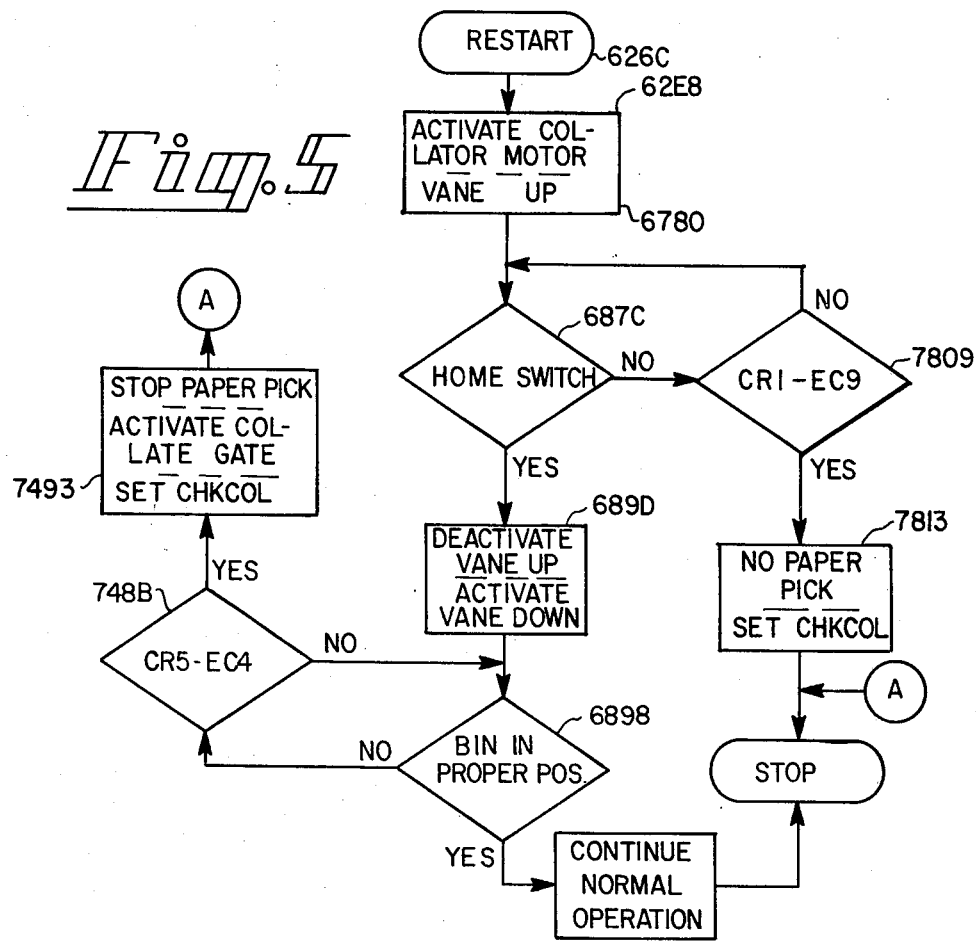
FIG. 5 is a flowchart showing the steps performed in error recovery.

The procedure for recovering from an index or sheet error is flowcharted in FIG. 5 and shown in detail in Microcode Table V. As pointed out above, various segments of the code for performing the recovery procedure are located in various subroutines and processes; therefore, the location codes in the Microcode Table V are not in sequential order. Program details of Table V are arranged in the approximate order in which the machine executes them to perform the function as shown in the flowchart of FIG. 5.

Even in the case of two collators, coupled to the same machine, there is only one CHECK COLLATOR indicator. To insure that the operator in fact checks the collator that caused the error, the door of the collator which caused the error must be opened and closed by the operator which sets a flag bit used by the program. After opening the door to check that there are no paper jams or the like, the door is closed and the start button is pushed by the operator. In the program beginning at location 675E, a test is made to determine that the operator has opened the door of the collator producing the error. This test is invoked at location 62D4 and is made at location 6760 for the first collator (COLDR12) and at location 6790 for the second collator (COLDR22).

After making various checks including one to ensure that the machine is not in the maintenance mode, the motor is started by the code beginning at location 62E8.

MICROCODE TABLE V

| LOC | OBJ | OP1 | OP2 | SOURCE STATEMENT | |
|---|---|---|---|---|---|
| | | | | BEGIN COLMTRON COLLATOR MOTOR CONTROL 'COLLATOR' | |
| | | | | 1. IF (COLMOTOR) MOTOR NOT ON | |
| 626C | A67D | 007D | | TPB     PCB15,COLMOTOR | SEE IF COLLATOR RUNNING |
| 626E | 95 | 0005 | | | |
| 626F | 342A | 632A | | BNZ     COL0870 * GO IF ON | |
| | | | | 1. THEN | |
| | | | | 2. . IF (PCADVNCE \| PRECOND) | |
| 6271 | A671 | 0071 | | TPB     PCB02,PCADVNCE | SEE IF ADVANCE |
| 6273 | 90 | 0000 | | | |
| 6274 | 3426 | 6326 | | BNZ     COL0860 * GO IF YES | |
| | | | | TPB     PSB07,PRECOND | SEE IF CONDITIONING |
| 6276 | A647 | 0047 | | | |
| 6278 | 90 | 0000 | | | |
| 6279 | 3426 | 6326 | | BNZ     COL0860 * GO IF YES | |
| | | | | 2. . THEN | |
| | | | | 3. . . IF (COLCE2 & CEMODE=(0\|1\|9\|12\|13)) | |
| . . . | | | | CODE TO CHECK NOT MAINTENANCE MODE, ETC. | |
| | | | | 5. . . . . THEN | |
| | | | | 6. . . . . . IF ((MOMRUNB & CEMODE=(2\|3)) \|(COLDR1 & COLDR2)) | |
| | | | | TPB     PSB21,MOMRUNB | SEE IF MOMENTARY RUN |
| 62D4 | A655 | 0055 | | | |
| 62D6 | 95 | 0005 | | | |
| 62D7 | 40 | 62E0 | | JZ      COL0825 | |
| 62D8 | A662 | 0062 | | LB      CEMODE | |
| 62DA | A802 | 0002 | | CI      CERUN | |
| 62DC | 48 | 62E8 | | JE      COL0830 | |
| 62DD | A803 | 0003 | | CI      CENOPAPR | |

MICROCODE TABLE V-continued

| LOC | OBJ | OP1 | OP2 | | SOURCE STATEMENT | | |
|---|---|---|---|---|---|---|---|
| 62DF | 48 | 62E8 | | | JE | COL0830 | |
| | | 62E0 | | COL0825 | DC | * | |
| | | | | | SRG | COLRG | SET GRP |
| 62E0 | A9D0 | 00D0 | | | | | |
| 62E2 | A607 | 0007 | | | LB | CPSB02 | GET STATUS |
| 62E4 | AB50 | 0050 | | | NI | P(COLDR12,COLDR22) | |
| 62E6 | 3426 | 6326 | | | BNZ | COL0860 | *GO IF EITHER DOOR OPEN |
| | | | | 6......THEN | | | |
| | | 62E8 | | COL0830 | DC | * | |
| | | | | 7.......SYNCHREQ=STRTCOL (START MOTOR) | | | |
| 62E8 | A989 | 0089 | | | GI | INTOFFCG+BASERG | |
| 62EA | A654 | 0054 | | | LB | PSB20 | GET STATUS |
| 62EC | AF02 | 0002 | | | OI | STRTCOL | SET START REQ |
| 62EE | A154 | 0054 | | | STB | PSB20 | UPDATE STATUS |
| | | | | | TPB | PCB06,COLATIND | SEE IF COLLATING |
| | | | | 3... IF (HOMCOL1R) | | | |
| | | | | | TPB | CPSB07,HOMCOL1R | |
| 6877 | A618 | 0018 | | | | | |
| 6879 | 97 | 0007 | | | | | |
| 687A | 3DB7 | 68B7 | | | BZ | COLVC115 | |
| | | | | 3... THEN | | | |
| | | | | 4.... IF (COL1HOM) | | | |
| | | | | | RIN | CSB06 | |
| 6898 | A60D | 000D | | | LB | VANRECCT | |
| 689A | A800 | 0000 | | | CI | 0 | |
| 689C | 44 | 68A4 | | | JE | COLVC80 | |
| | | | | 6......THEN | | | |
| | | | | 7.......MD1DOWNR=1 | | | |
| | | | | | TSB | CPSB07,MD1DOWNR | |
| 689D | A618 | 0018 | | | | | |
| 689F | AF20 | 0005 | | | | | |
| 68A1 | A118 | 0018 | | | | | |
| 68A3 | 009 | 68A9 | | | J | COLVC85 | |
| | | | | 6......ELSE | | | |
| | | 68A4 | | COLVC80 | DC | * | |
| | | | | 7.......RECVAN1R=0 | | | |
| | | | | | TRB | CPSB13,RECVAN1R | |
| 68A4 | A61D | 001D | | | | | |
| 68A6 | B2 | 0002 | | | | | |
| 68A7 | A11D | 001D | | | | | |
| | | | | 6......ENDIF | | | |
| | | 68A9 | | COLVC85 | DC | * | |
| 68A9 | 00 | 68B0 | | | J | COLVC100 | |
| | | | | 5.....ELSE | | | |
| | | 68AA | | COLVC90 | DC | * | |
| | | | | 6......COLDOWN=1 | | | |
| | | | | | TSB | CPSB06,COLDOWN | |
| 687C | A6C5 | 000C5 | | | | | |
| 687E | 96 | 0006 | | | TP | COL1HOM | |
| 687F | A9A0 | 00A0 | | | GI | INTOFF | |
| 6881 | A618 | 0018 | | | LB | CPSB07 | |
| 6883 | 3DB1 | 68B1 | | | BZ | COLVC105 | |
| | | | | 4.... THEN | | | |
| | | | | 5..... HOM1COLR, MD1DOWNR, MD1UPR, REVVANE=0 | | | |
| | | | | | TRM | P(HOMCOL1R,MD1DOWNR,MD1UPR,REVVANE) | |
| 6885 | AB1D | 001D | | | | | |
| 6887 | A118 | 0018 | | | STB | CPSB07 | |
| | | | | 5..... IF (RECVAN1R) | | | |
| | | | | | TPB | CPSB13,RECVAN1R | |
| 6889 | A61D | 001D | | | | | |
| 688B | 92 | 0002 | | | | | |
| 688C | 3DAA | 68AA | | | BZ | COLVC90 | |
| | | | | 5..... THEN | | | |
| | | | | 6......VANRECCT=VANECTR | | | |
| 688E | E4 | 0004 | | | LR | VANECTR | |
| 688F | A10D | 000D | | | STB | VANRECCT | |
| | | | | 6...... IF (COLDOWN) | | | |
| | | | | | TPB | CPSB06,COLDOWN | |
| 6891 | A617 | 0017 | | | | | |
| 6893 | 97 | 0007 | | | | | |
| 6894 | 68 | 6898 | | | JNZ | COLVC076 | |
| | | | | 6...... THEN | | | |
| | | | | 7....... CALL VECTUPDT (DECR VANRECCT) | | | |
| 6895 | 314867 | 0001 | 6748 | | BAL | R1,VECTUPDT | |
| | | | | 6...... ENDIF | | | |
| | | 6898 | | COLVC076 | DC | * | |
| | | | | 6...... IF (VANRECCT=0) | | | |
| 68AA | A617 | 0017 | | | | | |
| 68A0 | AF80 | 0007 | | | | | |

MICROCODE TABLE V-continued

| LOC | OBJ | OP1 | OP2 | SOURCE STATEMENT | | |
|---|---|---|---|---|---|---|
| 68AE | A117 | 0017 | | | | |
| | | | | 5.....ENDIF | | |
| | | 68B0 | | COLVC100 | DC | * |
| 68B0 | 05 | 68B5 | | | J | COLVC110 |
| | | | | 4....ELSE | | |
| | | 68B1 | | COLVC105 | DC | * |
| | | | | 5.....MD1UPR=1 | | |
| 68B1 | AF40 | 0006 | | | TS | MD1UPR |
| 68B3 | A118 | 0018 | | | STB | CPSB07 |
| | | | | 4....ENDIF | | |
| | | 68B5 | | COLVC110 | DC | * |
| 68B5 | 2CD0 | 68D0 | | | B | COLVC135 |
| | | | | 3...ELSE | | |
| | | 68B7 | | COLVC115 | DC | * |
| | | | | 4....IF (RECVAN1R) | | |
| | | | | | TPB | CPSB13,RECVAN1R |
| 68B7 | A61D | 001D | | | | |
| 68B9 | 92 | 0002 | | | | |
| 68BA | 3DD0 | 68D0 | | | BZ | COLVC130 |
| | | | | 4....THEN | | |
| | | | | 5.....IF ($\overline{\text{VANRECCT}}$=0) | | |
| 68BC | A9A0 | 00A0 | | | GI | INTOFF |
| 68BE | 25 | | | | CLA | |
| 68BF | A40D | 000D | | | AB | VANRECCT |
| 68C1 | 49 | 68C9 | | | JZ | COLVC120 |
| | | | | 5.....THEN | | |
| | | | | 6......MD1DOWNR=1 | | |
| | | | | | TSB | CPSB07,MD1DOWNR |
| 68C2 | A618 | 0018 | | | | |
| 68C4 | AF20 | 0005 | | | | |
| 68C6 | A118 | 0018 | | | | |
| 68C8 | 0E | 68CE | | | J | COLVC125 |
| | | | | 5.....ELSE | | |
| | | 68C9 | | COLVC120 | DC | * |
| | | | | 6......RECVAN1R=0 | | |
| | | | | | TRB | CPSB13,RECVAN1R |
| 68C9 | A61D | 001D | | | | |
| 680B | B2 | 0002 | | | | |
| 68CC | A11D | 001D | | | | |
| | | | | 5.....ENDIF | | |
| | | 68CE | | COLVC125 | DC | * |
| 68CE | A920 | 0020 | | | GI | INTON |
| | | | | 4....ENDIF | | |
| | | 68D0 | | COLVC130 | DC | * |
| | | | | 3...ENDIF | | |
| | | | | CHECK COLLATOR 2 INDEX PULSE | | |
| | | | | 6......IF (RECVAN2R) | | |
| | | | | | TBP | CPSB13,RECVAN2R |
| 6941 | A61D | 001D | | | | |
| 6943 | 93 | 0003 | | | | |
| 6944 | 3D66 | 6966 | | | BZ | COLVC240 |
| | | | | 6......THEN | | |
| | | | | 7.......IF VANECTR $\overline{0}$ | | |
| 6946 | 25 | | | | CLA | |
| 6947 | D4 | 0004 | | | AR | VANECTR |
| 6948 | 4B | 694B | | | JZ | COLVC221 |
| | | | | 7.......THEN | | |
| | | | | 8........VANRECCT=VANECTR-20 | | |
| 6949 | AA20 | 0020 | | | SI | X'20' |
| | | | | 7.......ELSE | | |
| | | | | COLVC221 | EQU | * |
| | | | | 8........VANRECCT=0 | | |
| 694B | A10D | 000D | | | STB | VANRECCT |
| | | | | 7.......ENDIF | | |
| | | | | 7.......IF ($\overline{\text{COLDOWN}}$) | | |
| | | | | | TPB | CPSB06,COLDOWN |
| 694D | A617 | 0017 | | | | |
| 694F | 97 | 0007 | | | | |
| 6950 | 3C55 | 6955 | | | BNZ | COLVC222 |
| | | | | 7.......THEN | | |
| | | | | 8........CALL VECTUPDT (DECR VANRECCT) | | |
| 6952 | 314867 | 0001 | 6748 | | BAL | R1,VECTUPDT |
| | | | | 7.......ENDIF | | |
| | | 6955 | | COLVC222 | DC | * |
| | | | | 7.......IF (VANRECCT $\overline{=0}$) | | |
| 6955 | A60D | 000D | | | LB | VANRECCT |
| 6957 | A800 | 0000 | | | CI | 0 |
| 6959 | 41 | 6961 | | | JE | COLVC225 |
| | | | | 7.......THEN | | |

MICROCODE TABLE V-continued

| LOC | OBJ | OP1 | OP2 | SOURCE STATEMENT |
|---|---|---|---|---|
| | | | | 8. . . . . . . . MD2DOWNR=1 |
| | | | |     TSB    CPSB07,MD2DOWNR |
| 695A | A618 | 0018 | | |
| 695C | AF04 | 0002 | | |
| 695E | A118 | 0018 | | |
| 6960 | 06 | 6966 | |     J    COLVC230 |
| | | | | 7. . . . . . . ELSE |
| | | 6961 | | COLVC225  DC    * |
| | | | | 8. . . . . . . . RECVAN2R=0 |
| | | | |     TRB    CPSB13,RECVAN2R |
| 6961 | A61D | 001D | | |
| 6963 | B3 | 0003 | | |
| 6964 | A11D | 001D | | |
| | | | | 7. . . . . . . ENDIF |
| | | 6966 | | COLVC230  DC    * |
| | | | | 6. . . . . . ENDIF |
| | | | | MISC. CODE |
| | | | | BEGIN VECTUPDT 'COLLSEG1' |
| 6748 | . . . | | |     ORG    VECTUPDT |
| | | | | 1. IF (VANRECCT =0) |
| 6748 | | | |     CLA |
| 6749 | A40D | 000D | |     AB    VANRECCT |
| 674B | 4A | 675A | |     JZ    VCTUP10 |
| | | | | 1. THEN |
| | | | | 2. . DECR VANRECCT |
| 674C | 2A | | |     S1 |
| 674D | A10D | 000D | |     STB    VANRECCT |
| 674F | AB0F | 000F | |     NI    X'0F' |
| 6751 | A80F | 000F | |     CI    X'0F' |
| 6753 | 6A | 675A | |     JNE    VCTUP10 |
| 6754 | A60D | 000D | |     LB    VANRECCT |
| 6756 | ABF9 | 00F9 | |     NI    X'F9' |
| 6758 | A10D | 000D | |     STB    VANRECCT |
| | | | | 1. ENDIF |
| | | 675A | | VCTUP10  DC    * |
| 675A | 21 | 0001 | |     RTN    R1 |
| | | 675E | |     DRG    COLRST1 |
| | | | | BEGIN COLRST1 'COLLSEG1' |
| 675E | A9A0 | 00A0 | |     GI    INTOFF |
| | | | | 1. IF (COLDR12) |
| | | | |     TPB    CPSB02,COLDR12 |
| 6760 | A607 | 0007 | | |
| 6762 | 96 | 0006 | | |
| 6763 | 3D90 | 6790 | |     BZ    COLRST11 |
| | | | | 1. THEN |
| | | | | 2. . COLPCT1, CPYATCOL, COLALGNL, COLALGNA=0 |
| 6765 | A608 | 0008 | |     LB    CPSB03 |
| 6767 | ABE0 | 00E0 | |     NI    P0(CPYATCOL,COLALGNL,COLALGNA,BIT1,BIT0) |
| 6769 | A108 | 0008 | |     STB    CPSB03 |
| | | | | 2. . COLPCT2, CPYATCP1, COLPTH1L, COLPTH1A=0 |
| 676B | A609 | 0009 | |     LB    CPSB04 |
| 676D | ABE0 | 00E0 | |     NI    P0(CPYATCP1,COLPTH1L,COLPTH1A,BIT1,BIT0) |
| 676F | A109 | 0009 | |     STB    CPSB04 |
| | | | | 2. . COLPCT3, COLVANE1, COLVANE2=0 |
| 6771 | A617 | 0017 | |     LB    CPSB06 |
| 6773 | AB9C | 009C | |     NI    P0(COLVANE1,COLVANE2,BIT1,BIT0) |
| 6775 | A117 | 0017 | |     STB    CPSB06 |
| | | | | 2. . IF (VANERR1) |
| 6777 | A61D | 001D | |     LB    CPSB13 |
| 6779 | B0 | 0000 | |     TR    VANERR1 |
| 677A | 3D90 | 6790 | |     BZ    COLRST11 |
| | | | | 2. . THEN |
| | | | | 3. . . VANERR1=0 |
| 677D | AF04 | 0002 | |     TS    RECVAN1R |
| 677F | A11D | 001D | |     STB    CPSB13 |
| | | | | 3. . . HOMCOL1R=1 |
| | | | |     TSB    CPSB07,HOMCOL1R |
| 6780 | A618 | 0018 | | |
| 6782 | AF80 | 0007 | | |
| 6784 | A118 | 0018 | | |
| | | | | 3. . . CRA1=1 |
| | | | |     SRG    BASERG |
| 6786 | A9C9 | 00C9 | | |
| | | | |     TSB    CRHI,CRA1 |
| 6788 | A614 | 0014 | | |
| 678A | AF08 | 0003 | | |
| 678C | A114 | 0014 | | |
| | | | |     SRG    COLRG |
| 678E | A9D0 | 00D0 | | |
| | | | | 2. . ENDIF |
| | | | | 1. ENDIF |

MICROCODE TABLE V-continued

| LOC | OBJ | OP1 | OP2 | SOURCE STATEMENT | | |
|---|---|---|---|---|---|---|
| | | 6790 | | COLRST11 | DC | * |
| | | | | 1. IF (COLDR22) | | |
| | | | | | TPB | CPSB02,COLDR22 |
| 6790 | A607 | 0007 | | | | |
| 6792 | 94 | 0004 | | | | |
| 6793 | 3DBA | 67BA | | | BZ | COLRST12 |
| | | | | 1. THEN | | |
| | | | | 2. . COLPCT4, CPYATOP2, COLPTH2L, COLPTH2A=0 | | |
| | | | | | LB | CPSB05 |
| 6795 | A616 | 0016 | | | | |
| 6797 | ABE0 | 00E0 | | | NI | P0(CPYATCP2,COLPTH2L,COLPTH2A,BIT1,BIT0) |
| 6799 | A116 | 0016 | | | STB | CPSB05 |
| | | | | 2. . COLPCT5, COLVANE1, COLVANE2=0 | | |
| 679B | A617 | 0017 | | | LB | CPSB06 |
| 679D | AB93 | 0093 | | | NI | P0(COLVANE1,COLVANE2,BIT3,BIT2) |
| 679F | A117 | 0017 | | | STB | CPSB06 |
| | | | | 2. . IF (VANERR2) | | |
| 67A1 | A61D | 001D | | | LB | CPSB13 |
| 67A3 | B1 | 0001 | | | TR | VANERR2 |
| 67A4 | 3DBA | 67BA | | | BZ | COLRST12 |
| | | | | 2. . THEN | | |
| | | | | 3. . . VANERR2=0 | | |
| | | | | 3. . . RECVAN2R=1 | | |
| 67A6 | AF08 | 0003 | | | TS | RECVAN2R |
| 67A8 | A11D | 001D | | | STB | CPSB13 |
| | | | | 3. . . HOMCOL2R=1 | | |
| | | | | | TSB | CPSB07,HOMCOL2R |
| 67AA | A618 | 0018 | | | | |
| 67AC | AF10 | 0004 | | | | |
| 67AE | A118 | 0018 | | | | |
| | | | | 3. . . CRA1=1 | | |
| | | | | | SRG | BASERG |
| 67B0 | A9C9 | 00C9 | | | | |
| | | | | | TSB | CRHI,CRA1 |
| 67B2 | A614 | 0014 | | | | |
| 67B4 | AF08 | 0003 | | | | |
| 67B6 | A114 | 0014 | | | | |
| | | | | | SRG | COLRG |
| 67B8 | A9D0 | 00D0 | | | | |
| | | | | 2. . ENDIF | | |
| | | | | 1. ENDIF | | |
| | | 67BA | | COLRST12 | DC | * |
| | | | | 1. IF (COLDR12 \| COLDR22) | | |
| 67BA | A607 | 0007 | | | LB | CPSB02 |
| 67BC | AB50 | 0050 | | | NI | P(COLDR12,COLDR22) |
| 67BE | 45 | 6705 | | | JZ | COLRST13 |
| | | | | 1. THEN | | |
| | | | | 2. . CHERROR, CSERROR, COLSTOP=0 | | |
| | | | | | TRMB | CPSB08,P(CHERROR,CSERROR,COLSTOP) |
| 67BF | A619 | 0019 | | | | |
| 67C1 | AB1F | 001F | | | | |
| 67C3 | A119 | 0019 | | | | |
| | | | | 1. ENDIF | | |
| | | 67C5 | | COLRST13 | DC | * |
| 67C5 | A920 | 0020 | | | GI | INTON |
| 67C7 | 21 | 0001 | | | RTN | R1 |
| | . . . | | | MISC. CODE | | |
| | | | | 2. . IF (COLMOTOR & $\overline{\text{COLGATE}}$) | | |
| | | | | | TPB | PCB15,COLMOTOR |
| 7481 | A67D | 007D | | | | |
| 7483 | 95 | 0005 | | | | |
| 7484 | 3DE5 | 74E5 | | | BZ | EC4E3Y9 |
| | | | | | TPB | PCB06,COLGATE |
| 7486 | A675 | 0075 | | | | |
| 7488 | 94 | 0004 | | | | |
| 7489 | 3CE5 | 74E5 | | | BNZ | EC4E3Y9 |
| | | | | 2. . THEN | | |
| | | | | 3. . . IF (RECVAN1R) | | |
| | | | | | SRG | COLRG |
| 748B | A9D0 | 00D0 | | | | |
| 748D | A61D | 001D | | | LB | CPSB13 |
| | | | | | SRG | INTHRG |
| 748F | A9C8 | 00C8 | | | | |
| 7491 | 92 | 0002 | | | TP | RECVAN1R |
| 7492 | 4D | 749D | | | JZ | EC4E3Y6 |
| | | | | 3. . . THEN | | |
| | | | | 4. . . . CALL VANESTP (F12) | | |
| | | | | | LID | COLF12ER |
| 7493 | AE07 | 0749 | | | | |
| 7495 | 29 | | | | | |
| 7496 | AE49 | 0749 | | | | |

MICROCODE TABLE V-continued

| LOC | OBJ | OP1 | OP2 | SOURCE STATEMENT | |
|---|---|---|---|---|---|
| 7498 | 321E67 | 0002 | 671E | BAL | R2,VANESTP |
| 749B | 2CE5 | 74E5 | | B | EC4E3Y9 |
| | | | | 3. . . ELSE | |
| | | 749D | | DC | * |
| | | | | 4. . . . IF (RECVAN2R) | |
| 749D | 93 | 0003 | | TP | RECVAN2R |
| 749E | 49 | 74A9 | | JZ | EC4E3Y7 |
| | | | | 4. . . . THEN | |
| | | | | 5. . . . . CALL VANESTP (F17) | |
| | | | | LID | COLF17ER |
| 749F | AE07 | 0757 | | | |
| 74A1 | 29 | | | | |
| 74A2 | AE57 | 0757 | | | |
| 74A4 | 321E67 | 0002 | 671E | BAL | R2,VANESTP |
| 74A7 | 2CE5 | 74E5 | | B | EC4E3Y9 |
| | | | | 4. . . . ELSE | |
| | | 74A9 | | DC | * |
| | | | | 5. . . . . IF HOMCOL1R | |
| | | | | SRG | COLRG |
| 74A9 | A9D0 | 00D0 | | | |
| 74AB | A618 | 0018 | | LB | CPSB07 |
| 74AD | B7 | 0007 | | TR | HOMCOL1R |
| 74AE | 3DCA | 74CA | | BZ | EC4E3Y8 |
| | | | | 5. . . . . THEN | |
| | | | | 6. . . . . . HOMCOL1R=0 | |
| 74B0 | A118 | 0018 | | STB | CPSB07 |
| | | | | 6. . . . . . COLPCT3=3 | |
| 74B2 | A617 | 0017 | | LB | CPSB06 |
| 74B4 | AF03 | 0003 | | OI | COLPCT3 |
| 74B6 | A117 | 0017 | | STB | CPSB06 |
| | | | | 6. . . . . . VANERR1=1 | |
| | | | | TSB | CPSB13,VANERR1 |
| 74B8 | A61D | 001D | | | |
| 74BA | AF01 | 0000 | | | |
| 74BC | A11D | 001D | | | |
| | | | | SRG | INTHRG |
| 74BE | A9C8 | 00C8 | | | |
| | | | | 6. . . . . . CALL CSOFTSTP (F15) | |
| | | | | LID | COLF15ER |
| 74C0 | AE07 | 0748 | | | |
| 74C2 | 29 | | | | |
| 74C3 | AE48 | 0748 | | | |
| 74C5 | 31EC66 | 0001 | 66EC | BAL | R1,CSOFTSTP |
| 74C8 | 2CE5 | 74E5 | | B | EC4E3Y9 |
| | | | | 5. . . . . ELSE | |
| | | 74CA | | DC | * |
| | | | | 6. . . . . . IF HOMCOL2R | |
| 74CA | B4 | 0004 | | TR | HOMCOL2R |
| 74CB | 3DE5 | 74E5 | | BZ | EC4E3Y9 |
| | | | | 6. . . . . . THEN | |
| | | | | 7. . . . . . . HOMCOL2R=0 | |
| 74CD | A118 | 0018 | | STB | CPSB07 |
| | | | | 7. . . . . . . COLPCT5=3 | |
| 74CF | A617 | 0017 | | LB | CPSB06 |
| 74D1 | AF0C | 000C | | OI | COLPCT5 |
| 74D3 | A117 | 0017 | | STB | CPSB06 |
| | | | | 7. . . . . . . VANERR2=1 | |
| | | | | TSB | CPSB13,VANERR2 |
| 74D5 | A61D | 001D | | | |
| 74D7 | AF02 | 0001 | | | |
| 74D9 | A11D | 001D | | | |
| | | | | SRG | INTHRG |
| 74DB | A9C8 | 00C8 | | | |
| | | | | 7. . . . . . . CALL CSOFTSTP (F16) | |
| | | | | LID | COLF16ER |
| 74DD | AE07 | 0756 | | | |
| 74DF | 29 | | | | |
| 74E0 | AE56 | 0756 | | | |
| 74E2 | 31EC66 | 0001 | 66EC | BAL | R1,CSOFTSTP |
| | | | | 6. . . . . . ENDIF | |
| | | | | 5. . . . . ENDIF | |
| | | | | 4. . . . ENDIF | |
| | | | | 3. . . ENDIF | |
| | | | | 2. . ENDIF | |
| | | | | MISC. CODE | |
| | | | | BEGIN EC9 CODE 'INTH3' | |
| | | 7803 | | DC | * |
| | | | | 1. IF CR1 | |
| 7803 | E4 | 0004 | | LR | CRREG |
| 7804 | 97 | 0007 | | TP | CR1 |
| 7805 | 3D42 | 7842 | | BZ | EC9A1 |

MICROCODE TABLE V-continued

| LOC | OBJ | OP1 | OP2 | SOURCE STATEMENT | | |
|------|-------|------|------|------|------|------|
| | | | | SRG | COLRG | |
| 7807 | A9D0 | 00D0 | | | | |
| | | | | 1. THEN | | |
| | | | | 2. . IF (RECVAN1R & HOM1COLR) | | |
| | | | | TPB | CPSB13,RECVAN1R | |
| 7809 | A61D | 001D | | | | |
| 780B | 92 | 0002 | | | | |
| 780C | 3D22 | 7822 | | BZ | EC9A0 | |
| | | | | TPB | CPSB07,HOMCOL1R | |
| 780E | A618 | 0018 | | | | |
| 7810 | 97 | 0007 | | | | |
| 7811 | 3D22 | 7822 | | BZ | EC9A0 | |
| | | | | 2. . THEN | | |
| | | | | 3. . . CALL VANESTP | | |
| | | | | LID | COLF15ER | |
| 7813 | AE07 | 0748 | | | | |
| 7815 | 29 | | | | | |
| 7816 | AE48 | 0748 | | | | |
| | | | | SRG | INTHRG | |
| 7818 | A9C8 | 00C8 | | | | |
| 781A | 321E67 | 0002 | 671E | BAL | R2,VANESTP | |
| | | | | 3. . . RESET CR1 | | |
| 781D | E4 | 0004 | | LR | CRREG | |
| 781E | B7 | 0007 | | TR | CR1 | |
| 781F | 84 | 0004 | | STR | CRREG | |
| 7820 | 2C42 | 7842 | | B | EC9A1 | |
| | | | | 2. . ELSE | | |
| | | | 7822 | DC | * | |
| | | | | 3. . . IF (RECVAN2R & HOMCOL2R) | | |
| | | | | TPB | CPSB13,RECVAN2R | |
| 7822 | A61D | 001D | | | | |
| 7824 | 93 | 0003 | | | | |
| 7825 | 3D42 | 7842 | | BZ | EC9A1 | |
| | | | | TPB | CPSB07,HOMCOL2R | |
| 7827 | A618 | 0018 | | | | |
| 7829 | 94 | 0004 | | | | |
| 782A | 3D42 | 7842 | | BZ | EC9A1 | |
| | | | | 3. . . THEN | | |
| | | | | 4. . . . CALL VANESTP (F16) | | |
| | | | | LID | COLF16ER | |
| 782C | AE07 | 0756 | | | | |
| 782E | 29 | | | | | |
| 782F | AE56 | 0756 | | | | |
| | | | | SRG | INTHRG | |
| 7831 | A9C8 | 00C8 | | | | |
| 7833 | 321E67 | 0002 | 671E | BAL | R2,VANESTP | |
| | | | | 4. . . . RESET CR1 | | |
| 7836 | E4 | 0004 | | LR | CRREG | |
| 7837 | B7 | 0007 | | TR | CR1 | |
| 7838 | 84 | 0004 | | STR | CRREG | |
| | | | | 4. . . . VANERR1=0, VANERR2=1 | | |
| | | | | SRG | COLRG | |
| 7839 | A9D0 | 00D0 | | | | |
| 783B | A61D | 001D | | LB | CPSB13 | |
| 783D | B0 | 0000 | | TR | VANERR1 | |
| 783E | AF02 | 0001 | | TS | VANERR2 | |
| 7840 | A11D | 001D | | STB | CPSB13 | |
| | | | | 3. . . ENDIF | | |
| | | | | 2. . ENDIF | | |
| | | | | 1. ENDIF | | |
| | | | | MISC. CODE | | |

At location 6780, the HOMCOL1R bit is set. This causes the directing means to be driven in the upward direction. At location 6877, the flag bit indicating that the directing means is moving toward the reference position is checked. If so, then at location 687C the home switch flag (COL1HOM) bit is tested to determine whether the directing means has reached the reference position.

Using the internal timing of the copier as a time-out indicator, if the RECVAN1R and HOM1COLR request bits are still on at location 7809, during the EC9 interrupt subroutine, then at location 7813 the program calls the VANESTP subroutine which, as explained above, causes the machine to stop. Included in the stop procedures are setting a flag that indicates that no more paper is to be picked and setting the CHKCOL bit referred to above. If the collator reaches the reference position before the time-out, then at location 689D, the VANEDWN request flag is set causing the directing means to step down one position.

A recovery counter (VANRECCT) is used to determine when the bin has reached the correct position. The sheet counter (VANECTR), which is used during normal operation of the collator, contains the number of the bin to which the next copy is to be delivered. At restart, this represents the proper bin number if the directing means were going down at the time the error occurred. If the directing means were traveling up, the sheet counter has a count value one greater than the correct bin. Therefore, at location 688E, the contents of the VANECTR byte are stored in the VANRECCT location. At location 6891, a test is made of the direction the directing means was moving at the time of the error. If the down flag bit (COLDOWN) is not set, the directing means was moving in the upward direction and, therefore, at location 6895, the VECTUPDT subroutine is called to decrement the VANERECCT by one. At location 6898, a test is made to determine whether the VANRECCT is zero. If not, then the DOWNR request bit is set, causing the directing means to step down by one bin. If the VANRECCT is zero, then at location 68A4, the RECVAN1R bit is reset. At location 68B7, if the RECVAN1R bit is still set and at location 68BC, the VANRECCT is not zero, then at location 68C2, the directing means is stepped down another bin. This stepping operation continues until the VANRECCT is zero indicating at location 6898 that the directing means is at the proper bin or until a time-out in the routine EC4. At location 748B, during the EC4 subroutine, the RECVAN1R bit is checked and if set, then at location 7493 the VANESTP subroutine is called which causes the machine to be shut down.

If the directing means reaches the proper bin before the time-out, then normal operation resumes.

It has been shown and described how operation errors can be detected in the operation of a collator and how proper operation can be restored automatically. Various modifications to the systems and circuits described and illustrated to explain the concepts and modes of practicing the invention can be made by those of ordinary skill of the art within the principles or scope of the invention as expressed in the appended claims.

What is claimed is:

1. In sheet collator apparatus having a plurality of bin means for receiving sheets and directing means for directing a sheet into one of said bin means, the improvement comprising:
   first switch means for supplying a first signal indicating that a sheet has entered one of said bin means;
   second switch means coupled to said directing means for supplying a second signal indicating that said directing means is operably disposed at one of said bin means; and
   detector means responsive to said first and second signals for detecting an error in the operation sequence of said sheet collator apparatus.

2. The invention as claimed in claim 1 wherein said sequence detector means includes
   latching means for being latched in a first state in response to said first signal and in a second state in response to said second signal;
   error means responsive to the state of said latching means and to said first and second signals for supplying a signal indicative of an error when said first signal occurs when said latching means is in said first state and when said second signal occurs when said latching means is in said second state.

3. The invention as claimed in claim 2 including means responsive to said error indicating signal and the state of said latching means for supplying signals indicative of the type of error detected.

4. A method for detecting an error in the distribution sequence of a sheet collator having a plurality of bin means for receiving sheets and directing means for directing a sheet into the bins comprising the steps of:
   supplying a first signal indicating that a sheet has entered one of said bins;
   supplying a second signal indicating that the directing means is operably disposed at one of said bins; and
   detecting, in response to said first and second signals, an error in the operation sequence of the sheet collator.

5. The invention as claimed in claim 4 wherein said detecting steps include:
   latching a first state in response to said first signal and a second state in response to said second signal; and
   supplying a signal indicative of an error when said first signal occurs when a first state is latched or when said second signal occurs when a second state is latched.

6. The invention as claimed in claim 5 including the step of supplying signals indicative of the type of error detected.

7. The invention as claimed in claim 4 further including the step of recovering by correctly disposing said directing means according to indications from said detecting step to permit resumption of correct operation of the sheet collator.

8. The invention as claimed in claim 7 wherein said recovering step includes:
   moving said directing means to a reference when an error is detected;
   supplying a third signal indicating that said directing means is disposed at the reference position;
   supplying a count signal representative of the disposition of said directing means; and
   moving said directing means to that one of said bin means at which an error was detected.

9. The invention as claimed in claim 8 further including the steps of:
   supplying a time-out signal a predetermined period of time after said directing means is started toward said reference position; and
   disabling said homing means and indicating that said directing means is inoperable if said third signal is not supplied before said time-out signal.

* * * * *